(12) United States Patent
Takano et al.

(10) Patent No.: US 9,727,197 B2
(45) Date of Patent: *Aug. 8, 2017

(54) ELECTRONIC DEVICE AND COORDINATE DETECTING METHOD

(71) Applicant: PANASONIC INTELLECTUAL PROPERTY CORPORATION OF AMERICA, Torrance, CA (US)

(72) Inventors: Tomoki Takano, Kanagawa (JP); Takeshi Yamaguchi, Kanagawa (JP); Yuuichi Takizawa, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/050,510

(22) Filed: Feb. 23, 2016

(65) Prior Publication Data
US 2016/0170536 A1    Jun. 16, 2016

Related U.S. Application Data

(63) Continuation of application No. 14/451,576, filed on Aug. 5, 2014.

(30) Foreign Application Priority Data

Aug. 8, 2013 (JP) ................................ 2013-164960
May 28, 2014 (JP) ................................ 2014-110345

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04101* (2013.01); *G06F 2203/04105* (2013.01); *G06F 2203/04108* (2013.01)

(58) Field of Classification Search
None
See application file for complete search history.

(56) References Cited

U.S. PATENT DOCUMENTS 5,541,372 A * 7/1996 Baller .................. G06F 3/0414
178/18.01
6,492,979 B1 * 12/2002 Kent ..................... G06F 3/0414
178/18.01

(Continued)

FOREIGN PATENT DOCUMENTS

EP    2037349    3/2009
EP    2426580    3/2012

(Continued)

OTHER PUBLICATIONS

United Kingdom Office action, mail date is Oct. 22, 2014.

*Primary Examiner* — Jose Soto Lopez
(74) *Attorney, Agent, or Firm* — Greenblum & Bernstein, P.L.C.

(57) ABSTRACT

An electronic device includes a housing, a display, an electrostatic-capacitance touch panel, a transparent member that protects the touch panel, and a depression detector. The touch panel is configured to detect a pair of two-dimensional coordinates indicated by an indicator having predetermined conductivity, wherein when the touch panel detects a plurality of pairs of two-dimensional coordinates and when the depression detector detects a predetermined amount of deformation, at least one pair of two-dimensional coordinates detected during a predetermined time period prior to a time when the deformation is detected is validated; and a (Continued)

pair of two-dimensional coordinates detected before the predetermined time period prior to the time when the deformation is detected, is not validated, wherein the predetermined time period does not include a deformation of an amount equal to or greater than the predetermined amount of deformation.

16 Claims, 25 Drawing Sheets

(56) References Cited

U.S. PATENT DOCUMENTS

| | | | | |
|---|---|---|---|---|
| 9,310,950 | B2* | 4/2016 | Takano | G06F 3/044 |
| 2006/0244733 | A1* | 11/2006 | Geaghan | G06F 3/041 |
| | | | | 345/173 |
| 2007/0257821 | A1* | 11/2007 | Son | G06F 3/016 |
| | | | | 341/22 |
| 2009/0065267 | A1* | 3/2009 | Sato | G01L 1/20 |
| | | | | 178/18.06 |
| 2011/0050629 | A1* | 3/2011 | Homma | G06F 3/0414 |
| | | | | 345/174 |
| 2011/0157087 | A1* | 6/2011 | Kanehira | G06F 3/0414 |
| | | | | 345/174 |
| 2012/0056848 | A1* | 3/2012 | Yamano | G06F 3/0236 |
| | | | | 345/174 |
| 2012/0287054 | A1* | 11/2012 | Kuo | G06F 3/044 |
| | | | | 345/173 |
| 2013/0181941 | A1* | 7/2013 | Okuno | G06F 3/041 |
| | | | | 345/174 |
| 2013/0306459 | A1* | 11/2013 | Anno | G06F 3/044 |
| | | | | 200/600 |
| 2013/0342501 | A1* | 12/2013 | Molne | G06F 3/0414 |
| | | | | 345/174 |
| 2014/0085253 | A1* | 3/2014 | Leung | G06F 3/0414 |
| | | | | 345/174 |
| 2014/0184957 | A1* | 7/2014 | Satou | G06F 1/169 |
| | | | | 349/12 |
| 2014/0240251 | A1* | 8/2014 | Takano | G06F 3/041 |
| | | | | 345/173 |
| 2014/0354585 | A1* | 12/2014 | Cok | G06F 3/0414 |
| | | | | 345/174 |

FOREIGN PATENT DOCUMENTS

| | | |
|---|---|---|
| JP | 2006-323457 | 11/2006 |
| JP | 2009-87311 | 4/2009 |
| JP | 2009-181232 | 8/2009 |
| JP | 2011-53971 | 3/2011 |

* cited by examiner

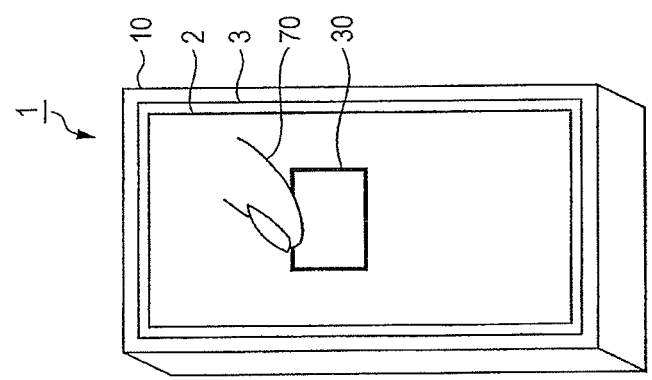
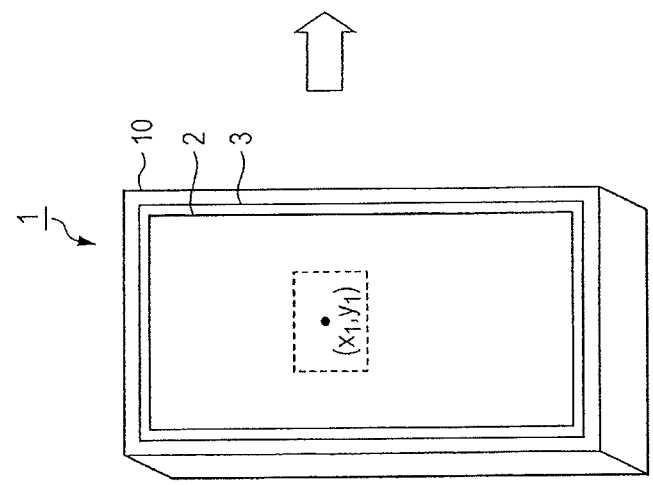

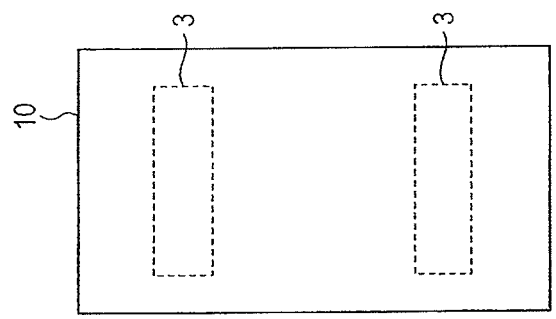
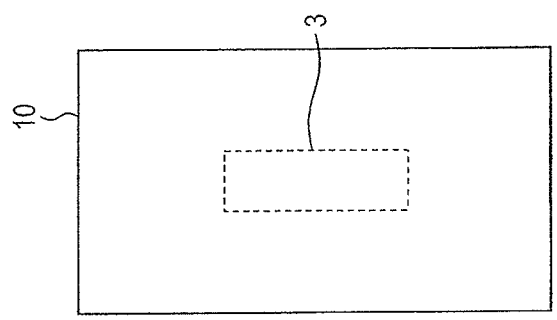
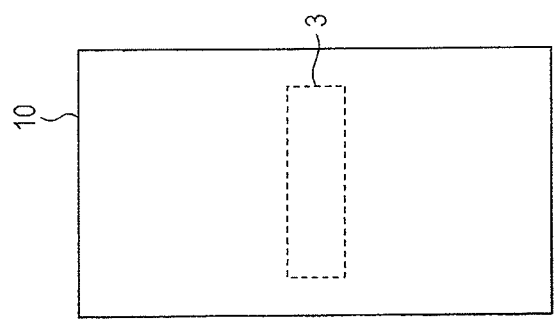

| # | DETECTION START TIME | DETECTION STATE (1/0) | x, y, z COORDINATES |
|---|---|---|---|
| 1 | 12:33:30.21 | 1 | 20. 30. 0 |
| 2 | 12:33:45.34 | 1 | 29. 41. 3 |
| 3 | 12:33:46.01 | 1 | 52. 2. 3 |
| 4 | 0 | 0 | 0. 0. 0 |
| 5 | 0 | 0 | 0. 0. 0 |
| 6 | 0 | 0 | 0. 0. 0 |
| 7 | 0 | 0 | 0. 0. 0 |
| 8 | 0 | 0 | 0. 0. 0 |
| 9 | 0 | 0 | 0. 0. 0 |
| 10 | 0 | 0 | 0. 0. 0 |

FIG. 23A

| # | DETECTION START TIME | DETECTION STATE (1/0) | x, y, z COORDINATES |
|---|---|---|---|
| 1 | 14:01:20.78 | 1 | 7. 16. 1 |
| 2 | 14:01:30.05 | 1 | 15. 20. 3 |
| 3 | 14:01:31.66 | 1 | 60. 31. 3 |
| 4 | 0 | 0 | 0. 0. 0 |
| 5 | 0 | 0 | 0. 0. 0 |
| 6 | 0 | 0 | 0. 0. 0 |
| 7 | 0 | 0 | 0. 0. 0 |
| 8 | 0 | 0 | 0. 0. 0 |
| 9 | 0 | 0 | 0. 0. 0 |
| 10 | 0 | 0 | 0. 0. 0 |

FIG. 23B

| # | DETECTION START TIME | DETECTION STATE (1/0) | x, y, z COORDINATES |
|---|---|---|---|
| 1 | 15:54:18.25 | 1 | 30. 16. 0 |
| 2 | 15:54:20.11 | 1 | 15. 23. 2 |
| 3 | 15:54:22.78 | 1 | 41. 61. 1 |
| 4 | 0 | 0 | 0. 0. 0 |
| 5 | 0 | 0 | 0. 0. 0 |
| 6 | 0 | 0 | 0. 0. 0 |
| 7 | 0 | 0 | 0. 0. 0 |
| 8 | 0 | 0 | 0. 0. 0 |
| 9 | 0 | 0 | 0. 0. 0 |
| 10 | 0 | 0 | 0. 0. 0 |

FIG. 23C

| # | DETECTION START TIME | DETECTION STATE (1/0) | x, y, z COORDINATES |
|---|---|---|---|
| 1 | 16:00:51.37 | 1 | 56. 19. 1 |
| 2 | 16:00:54.67 | 1 | 49. 59. 3 |
| 3 | 16:00:59.24 | 1 | 39. 42. 2 |
| 4 | 0 | 0 | 0. 0. 0 |
| 5 | 0 | 0 | 0. 0. 0 |
| 6 | 0 | 0 | 0. 0. 0 |
| 7 | 0 | 0 | 0. 0. 0 |
| 8 | 0 | 0 | 0. 0. 0 |
| 9 | 0 | 0 | 0. 0. 0 |
| 10 | 0 | 0 | 0. 0. 0 |

FIG. 23D

ELECTRONIC DEVICE AND COORDINATE DETECTING METHOD

CROSS REFERENCE TO RELATED APPLICATIONS

The present application is a continuation application of U.S. application Ser. No. 14/451,576 which claims the benefit of Japanese Patent Application No. 2013-164960, filed on Aug. 8, 2013, and Japanese Patent Application No. 2014-110345, filed on May 28, 2014, the disclosures of which are incorporated herein by reference in their entireties.

TECHNICAL FIELD

The present invention relates to an electronic device provided with a touch panel and also to a coordinate detecting method.

BACKGROUND ART

Electronic devices each provided with a touch panel, such as smartphones and tablets have been widespread. Such electronic devices include those provided with an electrostatic-capacitance touch panel, which can receive not only "touch operation" performed by finger(s) of a bare hand directly touching the surface of the touch panel, but also "hover operation" performed by the finger at a predetermined height from the surface of the touch panel without the finger of the bare hand touching the surface of the touch panel. Accordingly, the user can perform operation not only with a bare hand but also with a hand in a glove.

FIG. 19 schematically shows an example of configuration of an electrostatic-capacitance touch panel. In FIG. 19, transmission electrode 101 and reception electrode 102 are arranged apart from each other on a lower face of plate-like dielectric body 100. A drive pulse is applied to transmission electrode 101 from drive buffer 103 to generate an electric field. When a finger enters this electric field, the number of lines of electric force between transmission electrode 101 and reception electrode 102 decreases. This change in the lines of electric force appears as a change in electrical charge in reception electrode 102. Approach of a finger to the touch panel is detected from the change in the electrical charge in reception electrode 102.

FIGS. 20A to 20C show states where the fingers are detected when the fingers are gradually brought into proximity to an electrostatic-capacitance touch panel. FIG. 20A shows a state where the fingers do not enter an electric field, that is, the fingers are not detected. FIG. 20B shows a state where the fingers enter the electric field, but do not touch the touch panel, that is, hover operation is detected. FIG. 20C shows a state where the fingers enter the electric field and touch the touch panel, that is, touch operation is detected. It should be noted that operation performed by the fingers in a glove touching the touch panel corresponds to the state shown in FIG. 20B because the fingers do not directly touch the touch panel.

As the related art relating to such an electrostatic-capacitance touch panel, for example, Japanese Patent Application Laid-Open No. 2011-53971 (hereinafter, referred to as "PTL 1") discloses an information processing apparatus (hereinafter, referred to as "related art 1"). Related art 1 is an information processing apparatus configured to detect a degree of proximity of the fingers with respect to the touch panel and a value of pressure applied to the touch panel and to distinguish between touch operation and hover operation according to whether or not the degree of proximity and the value of pressure satisfy predetermined conditions.

Further, as another related art relating to the electrostatic-capacitance touch panel, for example, Japanese Patent Application Laid-Open No. 2009-181232 (hereinafter, referred to as "PTL 2") discloses a touch switch (hereinafter, referred to as "related art 2"). The touch switch according to related art 2 is configured to determine that "there is touch operation" when a detection value in the touch panel exceeds a first threshold and to determine that "there is hover operation" when a predetermined time period elapses in a state where the detection value in the touch panel is equal to or less than the first threshold but exceeds a second threshold. In addition, Japanese Patent Application Laid-Open No. 2009-87311 and No. 2006-323457 also disclose related techniques.

CITATION LIST

Patent Literature

PTL 1
Japanese Patent Application Laid-Open No. 2011-53971
PTL 2
Japanese Patent Application Laid-Open No. 2009-181232
PTL 3
Japanese Patent Application Laid-Open No. 2009-87311
PTL 4
Japanese Patent Application Laid-Open No. 2006-323457

SUMMARY OF INVENTION

Technical Problem

The electrostatic-capacitance touch panel detects a very small change in a capacitance value in order to detect hover operation. However, because a change in the capacitance value detected when a water droplet (as an example of a conductive material) adheres to the touch panel is similar to a change in the capacitance value detected when hover operation is actually performed for the touch panel, there is a possibility that when a water droplet adheres to the touch panel due to rainfall or the like, this adhesion may erroneously be detected as an executed hover operation.

Because the above related art 1 equally determines operation to be hover operation when a value of pressure applied by a finger approaching the touch panel is not greater than a predetermined value, it is impossible to distinguish between adhesion of a water droplet and the hover operation. Accordingly, in the above related art 1, when a water droplet adheres to the touch panel, there may be a case where the coordinates of the position to which the water droplet adheres are validated, which may result in an erroneous detection.

Meanwhile, the above related art 2 determines whether operation is touch operation or hover operation, as well as whether the operation is actual hover operation or adhesion of a water droplet. However, in related art 2, because unless hover operation continues for a certain period of time, the operation is not determined to be actual hover operation, when hover operation does not continue for a sufficient period of time, there may be a case where the operation is erroneously detected as adhesion of a water droplet.

Solution to Problem

An electronic device according to an aspect of the present invention includes: a housing; a display section that is disposed inside the housing and that displays predetermined information; an electrostatic-capacitance touch panel section that allows visible light corresponding to display contents of the display section to pass through the electrostatic-capacitance touch panel section; a transparent member that protects the touch panel section and that allows the visible light corresponding to the display contents of the display section to pass through the transparent member; and a depression detecting section that detects deformation of the transparent member, in which the touch panel section is configured to detect a pair of two-dimensional coordinates indicated by an indicator having predetermined conductivity and located away from the touch panel section at a predetermined distance, in which when the touch panel section detects a plurality of pairs of two-dimensional coordinates and when the depression detecting section detects a predetermined amount of deformation: at least one pair of two-dimensional coordinates detected during a predetermined time period towards past based on a time point when the deformation is detected is validated; and a pair of two-dimensional coordinates detected before the predetermined time period based on the time point when the deformation is detected is not validated.

Hence, in a state where a conductive material such as a water droplet still adheres to a touch panel, pairs of two-dimensional coordinates detected during the predetermined time towards the past based on a time point when operation is performed not only with a bare hand but also with a hand in a glove and depression is detected are validated, and pairs of two-dimensional coordinates before the predetermined time period are not validated. Consequently, it is possible to more reliably execute operation not only with a bare hand but also with a hand in a glove which is highly likely to be within the predetermined time immediately before depression and further prevent erroneous detection of adherence of a water droplet or the like as operation which is highly likely to be before the predetermined time period.

Further, in the electronic device according to the aspect of the present invention, the predetermined time period does not include the time point when the deformation is detected. That is, the touch panel section can detect a pair of two-dimensional coordinates of an indicator located away at a predetermined distance (vertical direction), and, when an indicator approaches the touch panel section and contacts and deforms the touch panel section, can detect a pair of two-dimensional coordinates of an indicator before the deformation is detected.

In the electronic device according to the aspect of the present invention, when the touch panel section detects a plurality of pairs of two-dimensional coordinates and when the depression detecting section detects a predetermined amount of deformation: one immediate pair of two-dimensional coordinates based on the time point when the deformation is detected is validated among pairs of two-dimensional coordinates detected during a predetermined time period towards past based on the time point when the deformation is detected; and a pair of two-dimensional coordinates detected before the predetermined time period based on the time point when the deformation is detected is not validated, and a pair of two-dimensional coordinates other than the one immediate pair of two-dimensional coordinates among pairs of two-dimensional coordinates detected during the predetermined time period is not validated.

Consequently, in a state where a conductive material such as a water droplet still adheres to a touch panel, when one pair of two-dimensional coordinates is validated, pairs of two-dimensional coordinates detected during the predetermined time towards the past based on a time point when operation is performed not only with a bare hand but also with a hand in a glove and depression is detected are validated, and pairs of two-dimensional coordinates before the predetermined time period are not validated. Consequently, it is possible to more reliably execute operation not only with a bare hand but also with a hand in a glove which are highly likely to be within the predetermined time immediately before depression and further prevent erroneous detection of adherence of a water droplet as operation which is highly likely to be before the predetermined time period. In addition, an immediate pair of coordinates is validated within the predetermined time period, so that it is possible to further prevent erroneous detection of adherence of a water droplet as operation.

In the electronic device according to the aspect of the present invention, after the immediate pair of two-dimensional coordinates based on the time point when the deformation is detected is validated among the pairs of two-dimensional coordinates detected during the predetermined time period towards past based on the time point when the deformation is detected, while the indicator that indicates the validated pair of two-dimensional coordinates moves away from the touch panel section at the predetermined distance, a change in the validated pair of two-dimensional coordinates is trackable, and a pair of two-dimensional coordinates newly detected after the validation and indicated by the indicator is not validated.

Consequently, after the immediate pair of two-dimensional coordinates is validated, a newly detected pair of two-dimensional coordinates indicated by an indicator is not validated. Consequently, it is possible to prevent erroneous detection of adherence of a water droplet as operation after the immediate pair of two-dimensional coordinates is validated.

In the electronic device according to the aspect of the present invention, the predetermined time period is a first predetermined time period, and when the touch panel section detects a plurality of pairs of two-dimensional coordinates and when the depression detecting section detects a predetermined amount of deformation: two immediate pairs of two-dimensional coordinates based on the time point when the deformation is detected are selected from pairs of two-dimensional coordinates detected during the first predetermined time period towards past based on the time point when the deformation is detected; when a difference between detection start times of the indicator that indicates the two selected pairs of two-dimensional coordinates is smaller than a second predetermined time period, the two selected pairs of two-dimensional coordinates are validated; and when the difference between detection start times of the indicator that indicates the two selected pairs of two-dimensional coordinates is larger than the second predetermined time period, one immediate pair of two-dimensional coordinates based on the time point when the deformation is detected is validated.

Consequently, in a state where a conductive material such as a water droplet still adheres to a touch panel, two immediate pairs of two-dimensional coordinates are selected from pairs of two-dimensional coordinates detected during the first predetermined time period towards the past based on the time point when operation is performed not only with a bare hand but also with a hand in a glove and depression is detected. Validating the two immediate pairs of two-dimensional coordinates based on the difference between the two immediate detection start times and validating one immediate pair of two-dimensional coordinates is switched so as not to validate pairs of two-dimensional coordinates before the validated pairs of two-dimensional coordinates. Consequently, it is possible to more reliably execute operation not only with a bare hand but also with a hand in a glove which are highly likely to be within the first predetermined time immediately before depression and further prevent erroneous detection of adherence of a water droplet as operation which is highly likely to be before the first predetermined time period. Further, it is possible to support one-point touch and two-point touch.

In the electronic device according to the aspect of the present invention, the second predetermined time period is shorter than the first predetermined time period.

In the electronic device according to the aspect of the present invention, after the two selected pairs of two-dimensional coordinates are validated, while one of indicators that indicates the validated pair of two-dimensional coordinates moves away from the touch panel section at the predetermined distance, a change in the validated pair of two-dimensional coordinates is trackable, and a pair of two-dimensional coordinates newly detected after the validation and indicated by the indicator is not validated.

Consequently, after the two immediate pairs of two-dimensional coordinates are validated, a newly detected pair of two-dimensional coordinates indicated by an indicator is not validated. Consequently, it is possible to prevent erroneous detection of adherence of a water droplet as operation after the two immediate pairs of two-dimensional coordinates are validated.

A coordinate detecting method according to an aspect of the present invention is a method to be used for an electronic device that includes: a housing; a display section that is disposed inside the housing and that displays predetermined information; an electrostatic-capacitance touch panel section that allows visible light corresponding to display contents of the display section to pass through the electrostatic-capacitance touch panel section; a transparent member that protects the touch panel section and that allows visible light corresponding to display contents of the display section to pass through the transparent member; and a depression detecting section that detects deformation of the transparent member, in which the touch panel section is configured to detect a pair of two-dimensional coordinates indicated by an indicator having predetermined conductivity and located away from the touch panel section at a predetermined distance, the method including: when the touch panel section detects a plurality of pairs of two-dimensional coordinates and when the depression detecting section detects a predetermined amount of deformation, validating at least one pair of two-dimensional coordinates detected during a predetermined time period towards past based on a time point when the deformation is detected; and not validating a pair of two-dimensional coordinates detected before the predetermined time period based on the time point when the deformation is detected.

Advantageous Effects of Invention

According to the present invention, it is possible to, in a state where a conductive material such as a water droplet still adheres to a touch panel, more reliably execute operation not only with a bare hand but also with a hand in a glove and further prevent erroneous detection of adherence of a water droplet as operation.

BRIEF DESCRIPTION OF DRAWINGS

FIGS. 4A and 4B show an example of an icon displayed in the electronic device according to Embodiment 1;

FIGS. 10A to 10C show an arrangement example of the depression sensor in the electronic device according to Embodiment 1;

FIGS. 23A to 23D each show a table which manages coordinate detection states in the electronic device according to Embodiment 3;

DESCRIPTION OF EMBODIMENTS (Embodiment 1)

Embodiment 1 of the present invention will be described in detail below with reference to the accompanying drawings.

Figure 1:
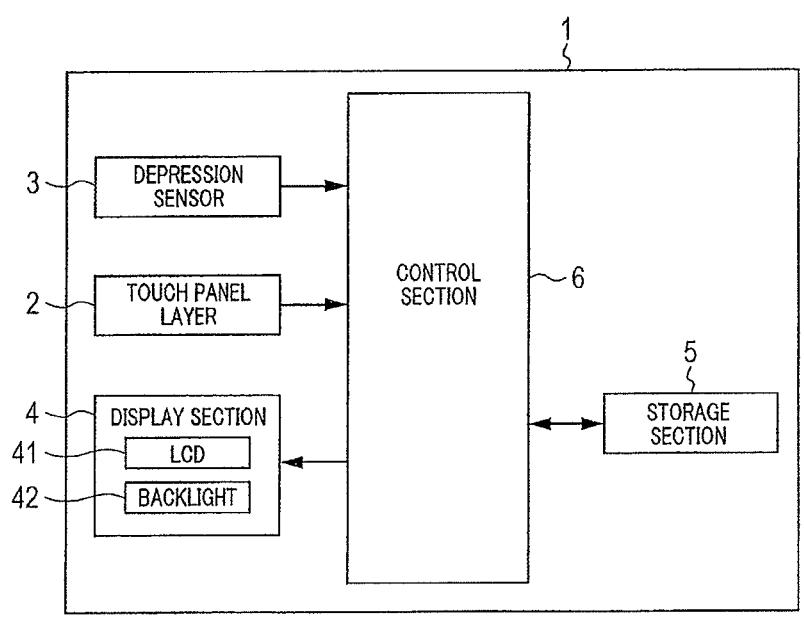
FIG. 1 is a block diagram showing an example of a schematic configuration of an electronic device according to Embodiment 1.

FIG. 1 is a block diagram showing an example of a schematic configuration of electronic device 1 according to Embodiment 1.

In FIG. 1, electronic device 1 includes touch panel layer 2, depression sensor 3, display section 4, storage section 5 and control section 6. Electronic device 1 is, for example, a smartphone or a tablet.

Touch panel layer 2, which employs an electrostatic capacitance system, can receive touch operation as well as hover operation. The touch operation is, as described above, operation performed by an indicator directly touching a touch panel surface. Meanwhile, the hover operation is, as described above, operation performed by an indicator at a predetermined height from the touch panel surface without the indicator directly touching the touch panel surface. Examples of the hover operation include operation performed by a finger in a glove touching the touch panel surface. The indicator is a finger of the human or an object having electric conductivity (such as a stylus pen). The description will be provided below assuming that the indicator is a finger. Further, the touch panel surface is a face which receives user operation in touch panel layer 2.

Figure 19:
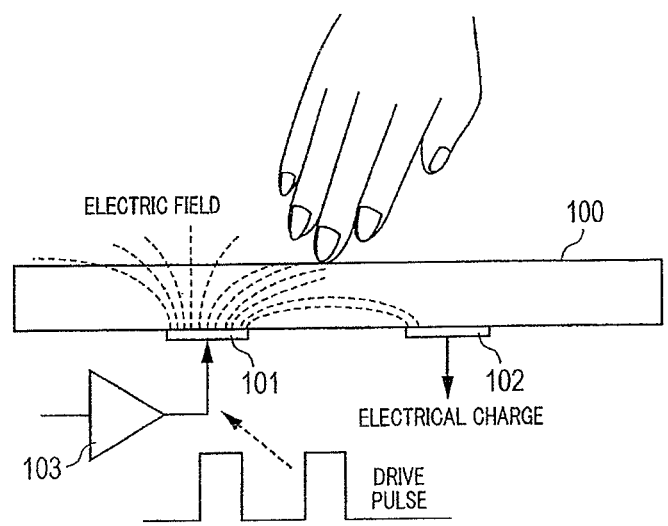
FIG. 19 shows a schematic configuration of a conventional electrostatic-capacitance touch panel.
Figures 20A, 20B, 20C:
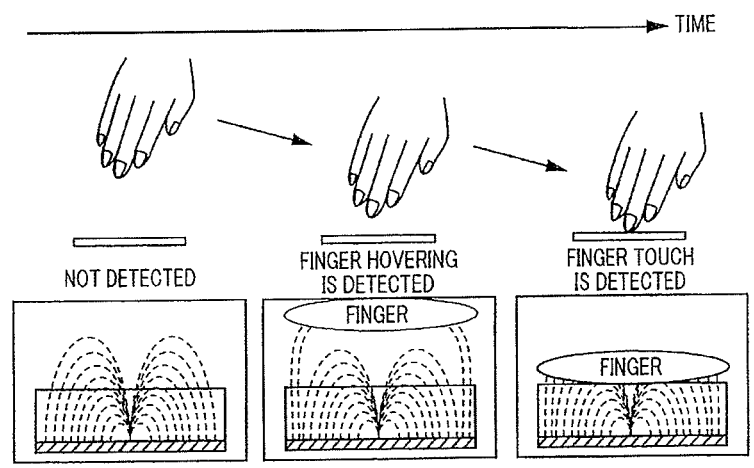
FIGS. 20A to 20C illustrate finger detection states when a hand is gradually brought into proximity with a touch panel.

As shown in FIG. 19, touch panel layer 2 includes transmission electrode 101 and reception electrode 102 which are arranged apart from each other on a lower face of plate-like dielectric body 100. A drive pulse based on a transmission signal is applied to transmission electrode 101. The application of the drive pulse to transmission electrode 101 generates an electric field from transmission electrode 101. If a finger enters this electric field, the number of lines of electric force between transmission electrode 101 and reception electrode 102 decreases, and this change in the number appears as a change in electrical charge in reception electrode 102.

Touch panel layer 2 (an example of a touch panel section) determines the number of the fingers, two-dimensional coordinates (x,y) indicated by the finger in display section 4, and a vertical distance (z) between a surface of touch panel layer 2 and the finger based on a received signal according to the change in electrical charge in reception electrode 102, and outputs information showing these to control section 6. It should be noted that the determination described here is performed at a touch panel control section (not shown) included in touch panel layer 2.

Figure 2:
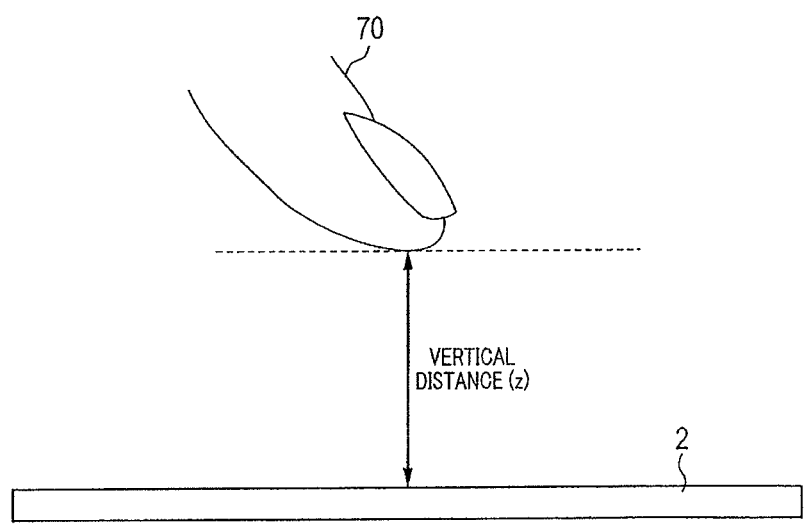
FIG. 2 shows an example of a positional relationship between a touch panel layer and the finger in the electronic device according to Embodiment 1.

The vertical distance (z) is, as shown in FIG. 2, a distance between the touch panel surface of touch panel layer 2 and finger 70. Finger 70 is one finger of a bare hand. If this vertical distance (z) is equal to or less than a predetermined value, touch panel layer 2 can determine the two-dimensional coordinates (x,y). It should be noted that although not shown in FIG. 2, glass (an example of a transparent member, glass 11 which will be described, hereinafter) for protecting touch panel layer 2 is provided on the touch panel surface.

Depression sensor 3 (an example of a depression detecting section) detects deformation (a predetermined amount of deformation) of the glass provided for protecting touch panel layer 2 and outputs a signal showing whether or not the glass is deformed to control section 6. It is assumed that the glass is deformed by being depressed by the indicator and is not deformed by adhesion of a water droplet, or the like. It should be noted that it is not necessarily required to use the signal showing whether or not the glass is deformed (i.e., showing the both of a state where the glass is deformed and a state where the glass is not deformed), but it is also possible to use a signal which shows either a state where the glass is deformed or a state where the glass is not deformed. Further, instead of depression sensor 3 itself determining whether or not the glass is deformed, depression sensor 3 may output a signal showing a degree of deformation of the glass to control section 6 and control section 6 may determine whether or not the glass is deformed.

Figure 3:
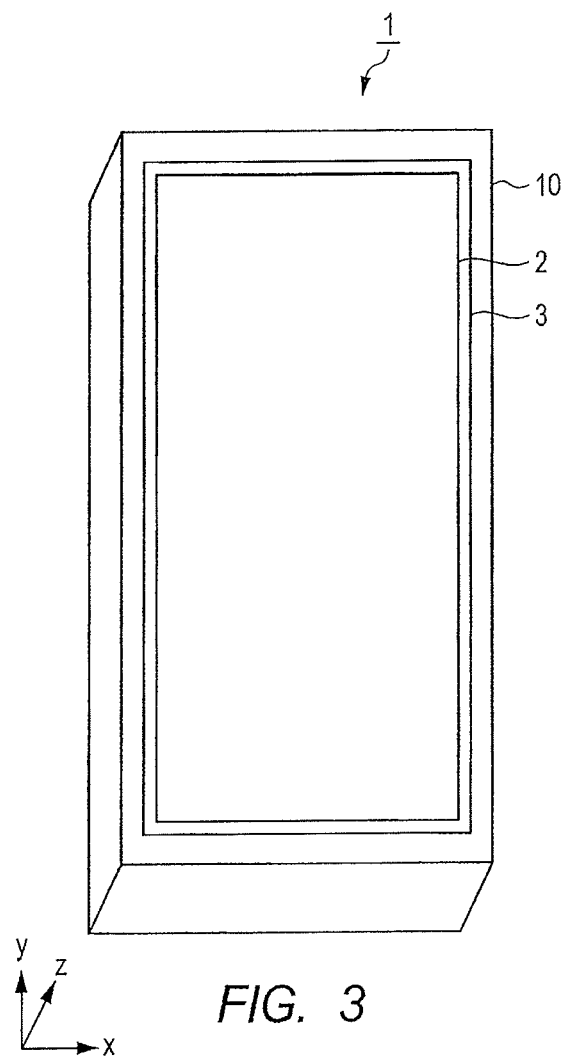
FIG. 3 is a perspective view showing an example of appearance of a front face of the electronic device according to Embodiment 1.

Arrangement of touch panel layer 2 and depression sensor 3 will be described below. As shown in FIG. 3, electronic device 1 has cuboid housing 10. In FIG. 3, at a front face side of this housing 10, touch panel layer 2 and depression sensor 3 are arranged. Touch panel layer 2 and depression sensor 3 are each formed in a rectangle which is vertically long in a plane view and are smaller in area than the front face of housing 10. While in FIG. 3, the area of depression sensor 3 is slightly larger than the area of touch panel layer 2, the area of depression sensor 3 may be smaller than the area of touch panel layer 2 as will be described later. Touch panel layer 2 is stacked on top of depression sensor 3 so that touch panel layer 2 is disposed at a front face side of depression sensor 3.

Although not shown in FIG. 3, the glass for protecting touch panel layer 2 is provided at the front face side (i.e., the touch panel surface) of touch panel layer 2 as described above. Further, in depression sensor 3, rectangular display section 4 which is vertically long in a plane view is disposed at a back side of the surface on which touch panel layer 2 is stacked.

Display section 4, which is an apparatus disposed inside housing 10 and displays predetermined information based on an instruction from control section 6, has LCD (Liquid Crystal Display) 41 and backlight 42. It should be noted that display section 4 may include a device such as an organic EL (Electro Luminescence) or electronic paper display in place of LCD 41.

Display section 4 displays a predetermined image (for example, pointer, icon, or the like) as a display operation corresponding to the two-dimensional coordinates (x,y) determined in touch panel layer 2. For example, when the two-dimensional coordinates ($x_1$, $y_1$) are effective coordinates as shown in FIG. 4A, icon 30 is displayed as shown in FIG. 4B. It should be noted that it is also possible to display a pointer corresponding to the two-dimensional coordinates (x,y) in FIG. 4B. In this case, it is also possible to put the icon into a selectable state when the pointer overlaps the icon. Further, it is also possible to activate a function corresponding to the icon when finger 70 approaches touch panel layer 2 within a predetermined vertical distance (z) (including zero). The display operation of the pointer and the icon, and activation of the function corresponding to the icon as described above are performed by the instruction from control section 6.

Figure 5:
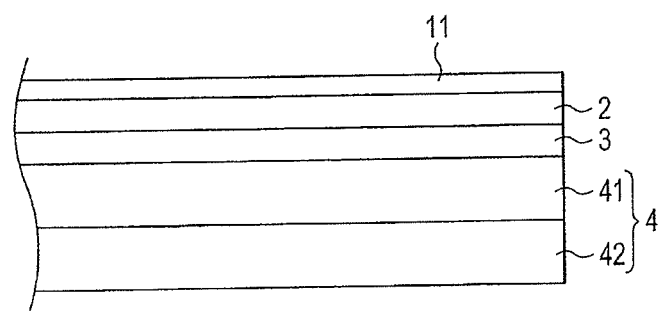
FIG. 5 is a sectional side view showing arrangement example 1 of glass, a touch panel layer, a depression sensor and a display section in the electronic device according to Embodiment 1.

Arrangement example 1 of touch panel layer 2, depression sensor 3 and display section 4 in electronic device 1 will be described. In FIG. 5, glass 11 for protecting touch panel layer 2 is disposed at the front face side of touch panel layer 2 while being overlapped with touch panel layer 2 as described above. Glass 11 and touch panel layer 2 each have a sheet shape and have predetermined transmittance of visible light and allow visible light to pass through a display region of display section 4 to transmit through glass 11 and touch panel layer 2. Further, at least part of glass 11 is disposed so as to be exposed from housing 10, while the other part is disposed inside housing 10. It should be noted that glass 11 may be integrated with touch panel layer 2.

Figure 21:
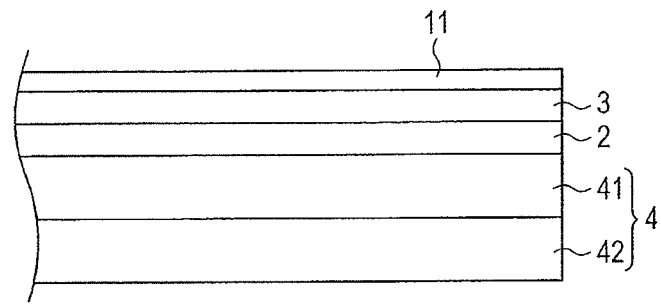
FIG. 21 is a sectional side view showing arrangement example 11 of the glass, the touch panel layer, the depression sensor and the display section in the electronic device according to Embodiment 1.

Further, as shown in FIG. 21, depression sensor 3 may be disposed between glass 11 and touch panel layer 2.

In FIG. 5, in touch panel layer 2, depression sensor 3 is disposed at the back side of the surface on which glass 11 is stacked as described above. Further, as described above, LCD 41 and backlight 42 forming display section 4 are arranged in that order at the back side of the surface on which touch panel layer 2 is stacked on depression sensor 3. Because depression sensor 3 is disposed at the front face side of display section 4 while being overlapped with display section 4 in this way, depression sensor 3 needs to be transparent and have permeability that allows visible light to pass through depression sensor 3 as with glass 11 and touch panel layer 2. It should be noted that depression sensor 3 may be integrated with touch panel layer 2.

Returning to FIG. 1, storage section 5, which has a volatile memory such as a DRAM (Dynamic Random Access Memory), stores settings when a user performs various settings on electronic device 1.

Control section 6, which controls each component of electronic device 1, includes a CPU (Central Processing Unit), a ROM (Read Only Memory), a RAM (Random Access Memory) and an interface circuit. The ROM stores a program for controlling the CPU, and the RAM is used as an operation area while the CPU operates.

In Embodiment 1, control section 6 performs coordinate determination processing based on input information from depression sensor 3 and touch panel layer 2. This coordinate determination processing will be described later using FIG. 6A to FIG. 6C, FIG. 7 and FIG. 8.

The coordinate determination processing performed by control section 6 will be described below as an operation example of electronic device 1 according to Embodiment 1.

First, a specific example of the coordinate determination processing will be described with reference to FIG. 6A to FIG. 6C.

Figure 6A:
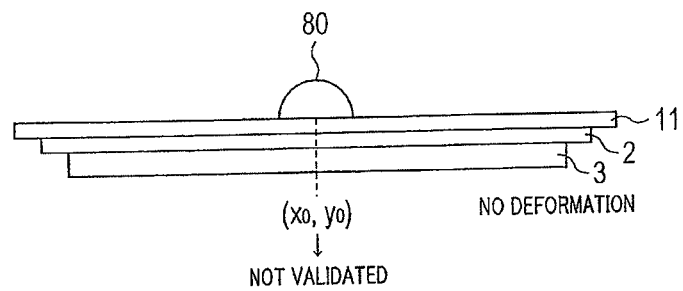
FIGS. 6A to 6C show an example of coordinate determination when the touch panel layer detects water and/or the finger in the electronic device according to Embodiment 1.

As shown in FIG. 6A, it is assumed that water droplet 80 adheres to glass 11 due to rainfall, or the like. At this time, touch panel layer 2 outputs two-dimensional coordinates $(x_0, y_0)$ of a position to which water droplet 80 adheres to control section 6. Further, depression sensor 3 outputs a signal showing that glass 11 is not deformed (hereinafter, referred to as a "no deformation signal") to control section 6. Because of reception of the no deformation signal, control section 6 does not validate the two-dimensional coordinates $(x_0, y_0)$. The term "validation" means that the two-dimensional coordinates are treated as effective coordinates. Accordingly, processing for the two-dimensional coordinates $(x_0, y_0)$ (for example, a display operation of information in display section 4 and the like) is not performed.

Figure 6B:
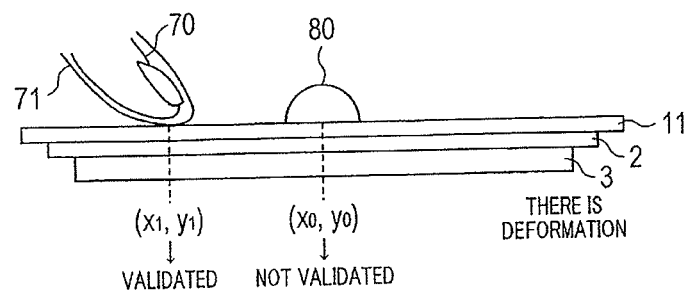

After the state illustrated in FIG. 6A, as shown in FIG. 6B, it is assumed that the user performs hover operation by touching glass 11 with finger 70 in glove 71 in a state where water droplet 80 adheres to glass 11. At this time, touch panel layer 2 outputs two-dimensional coordinates $(x_1, y_1)$ of a position contacted by glove 71 in addition to the two-dimensional coordinates $(x_0, y_0)$ which are being output, to control section 6. Further, depression sensor 3 outputs a signal showing that glass 11 is deformed by depression by glove 71 (hereinafter, referred to as a "deformation signal") to control section 6. By receiving the deformation signal, control section 6 validates only the two-dimensional coordinates $(x_1, y_1)$ which are received temporally later. Accordingly, processing for the two-dimensional coordinates $(x_1, y_1)$ is performed.

By so doing, in a state where a conductive material such as a water droplet still adheres to a touch panel, an immediate (last) pair of two-dimensional coordinates detected when operation is performed not only with a bare hand but also with a hand in a glove and depression is detected is validated, and a pair of two-dimensional coordinates therebefore is not validated. Consequently, it is possible to more reliably execute operation not only with a bare hand but also with a hand in a glove which are highly likely to be immediately before depression and further prevent erroneous detection of adherence of a water droplet as operation which is highly likely to be therebefore.

Figure 6C:
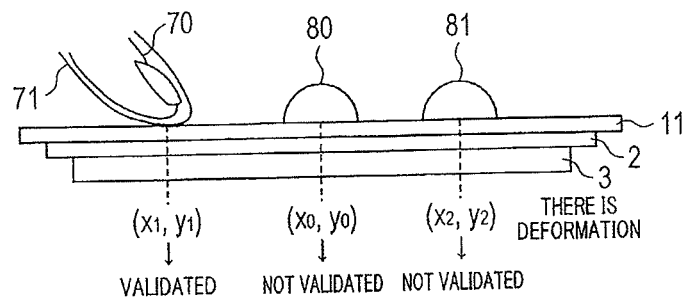

After the state illustrated in FIG. 6B, as shown in FIG. 6C, it is assumed that water droplet 81 adheres to glass 11 in a state where water droplet 80 adheres to glass 11 and the user performs hover operation by touching glass 11 with finger 70 in glove 71. At this time, touch panel layer 2 outputs two-dimensional coordinates $(x_2, y_2)$ of a position to which water droplet 80 adheres in addition to the two-dimensional coordinates $(x_0, y_0)$ and $(x_1, y_1)$ which are being output, to control section 6. Further, depression sensor 3 is outputting the deformation signal to control section 6 by the pressure by the hover operation. Although control section 6 receives the deformation signal, because control section 6 has already validated the two-dimensional coordinates $(x_1, y_1)$, control section 6 does not validate the two-dimensional coordinates $(x_2, y_2)$ which are received temporally later. Accordingly, while the processing for the two-dimensional coordinates $(x_1, y_1)$ is performed, processing for the two-dimensional coordinates $(x_2, y_2)$ is not performed. In this way, when the validated two-dimensional coordinates already exist, control section 6 does not validate new two-dimensional coordinates even if depression sensor 3 detects deformation of glass 11.

By so doing, when validation is maintained in a state where a conductive material such as a water droplet still adheres to a touch panel, a pair of two-dimensional coordinates determined after the validation is not validated. Consequently, it is possible to prevent erroneous detection of adherence of a water droplet as operation after the validation.

It should be noted that in FIG. 6A to FIG. 6C, the pairs of two-dimensional coordinates by adhesion of water droplets 80 and 81 and contact by glove 71 may remain still or may move. Further, control section 6 maintains the validation until release of the two-dimensional coordinates which have been validated once is detected. The term "release" refers to a state where the indicator moves away from touch panel layer 2 and the value of the vertical distance (z) is equal to or greater than a predetermined value. Release is detected when the two-dimensional coordinates are no longer received. While the validation is maintained, depression sensor 3 may output either a deformation signal or a no deformation signal to control section 6.

By so doing, validation is maintained while a distance between an indicator detected by the touch panel section and the touch panel section is shorter than the predetermined distance based on this distance. That is, when this distance becomes longer than the predetermined distance, the validation is stopped. Consequently, it is possible to stop validation irrespectively of an output of the depression detecting section.

When an operator performs press and hold operation by an indicator (e.g. finger) or performs flick operation, depression on the touch panel section gradually becomes weak upon the end of these operations. Therefore, it is difficult to determine the end of these operations from an output of the depression detecting section from which a moderate change in depression is hardly detected. However, it is possible to stop validation irrespectively of an output of the depression detecting section as described above and, consequently, adequately determine the end of these operations.

Further, control section 6 receives the number of indicators and the vertical distance together with the two-dimensional coordinates from touch panel layer 2. Hereinafter, information including the two-dimensional coordinates, the number of indicators and the vertical distance is referred to as "coordinate information."

Further, although a reference has been made to water droplets, the same also applies to liquid droplets of any liquid having predetermined conductivity, in addition to water.

The first example of the coordinate determination processing will be described using FIG. 7.

In step S101, control section 6 checks a deformation detection state of depression sensor 3 (i.e., whether depression sensor 3 detects deformation or no deformation of glass 11) based on the signal from depression sensor 3.

When receiving the no deformation signal from depression sensor 3, control section 6 determines that glass 11 is not deformed (step S102: NO), and the process returns to step S101. Meanwhile, when receiving the deformation signal from depression sensor 3, control section 6 determines that glass 11 is deformed (step S102: YES), and the process proceeds to step S103.

In step S103, control section 6 checks a two-dimensional coordinate determination state of touch panel layer 2 (i.e., whether touch panel layer 2 is determining a pair of two-dimensional coordinates) based on information from touch panel layer 2.

When not receiving coordinate information from touch panel layer 2, control section 6 determines that two-dimensional coordinates are not being determined (step S104: NO), the process returns to step S101. Meanwhile, when receiving coordinate information from touch panel layer 2, control section 6 determines that two-dimensional coordinates are being determined (step S104: YES), and the process proceeds to step S105.

In step S105, control section 6 validates the two-dimensional coordinates which are determined last. The two-dimensional coordinates validated in this step are two-dimensional coordinates indicated by the latest coordinate information received by control section 6 at this moment.

In step S106, control section 6 tracks the validated two-dimensional coordinates.

In step S107, control section 6 determines whether or not release of the validated two-dimensional coordinate is detected. The term "release" refers to a state where the indicator indicating the validated pair of two-dimensional coordinates moves away from the touch panel surface and the vertical distance (z) becomes equal to or greater than a predetermined value.

When receiving the coordinate information of the validated two-dimensional coordinates from touch panel layer 2, control section 6 determines that release is not detected (step S107: NO), and the process returns to step S106. Meanwhile, when control section 6 no longer receives the coordinate information of the validated two-dimensional coordinates from touch panel layer 2, control section 6 determines that release is detected (step S107: YES), and the process returns to step S101.

That is, when control section 6 validates the two-dimensional coordinates, control section 6 maintains the validated state of the two-dimensional coordinates unless release is detected even if the two-dimensional coordinates change. Further, control section 6 does not validate any pair of two-dimensional coordinates indicated by the coordinate information newly received while the validation is maintained, regardless of detection results of deformation.

In this way, according to electronic device 1 according to Embodiment 1, when depression sensor 3 detects deformation while touch panel layer 2 determines two-dimensional coordinates, only the two-dimensional coordinates which are determined last by touch panel layer 2 are validated. Accordingly, it is possible to perform operation without erroneous detection not only with a bare hand but also with a hand in a glove in a state where a conductive material such as a water droplet adheres to the touch panel surface.

It should be noted that, in electronic device 1 according to Embodiment 1, when depression sensor 3 does not detect deformation while touch panel layer 2 determines two-dimensional coordinates, it is possible to determine that a conductive material such as a water droplet adheres to the touch panel surface. In this case, electronic device 1 may display, for example, the determination result in display section 4.

Figure 7:
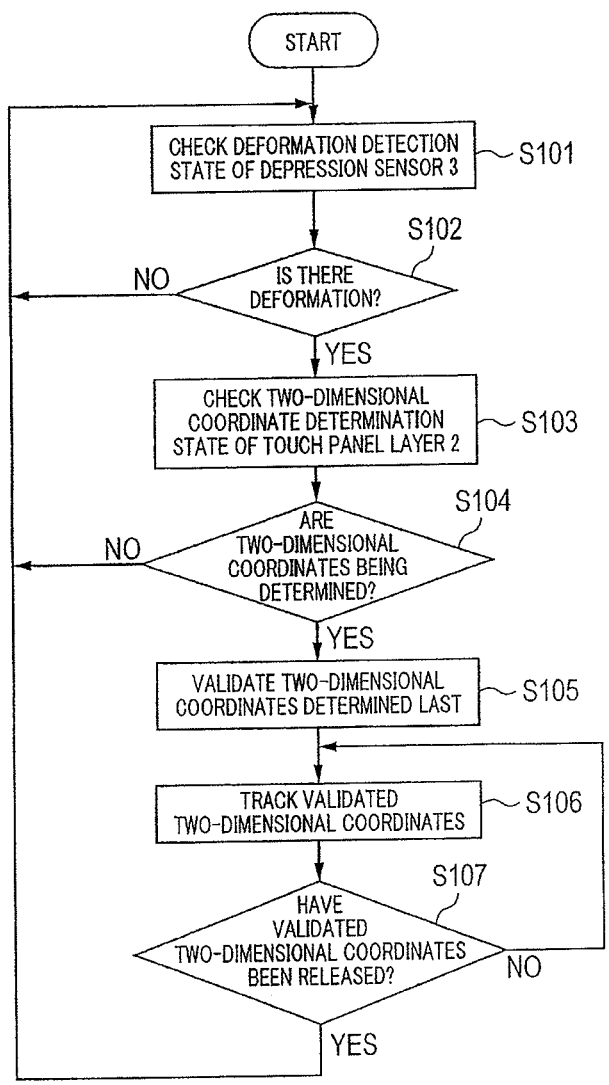
FIG. 7 is a flowchart showing an example of coordinate determination processing of the electronic device according to Embodiment 1.
Figure 8:
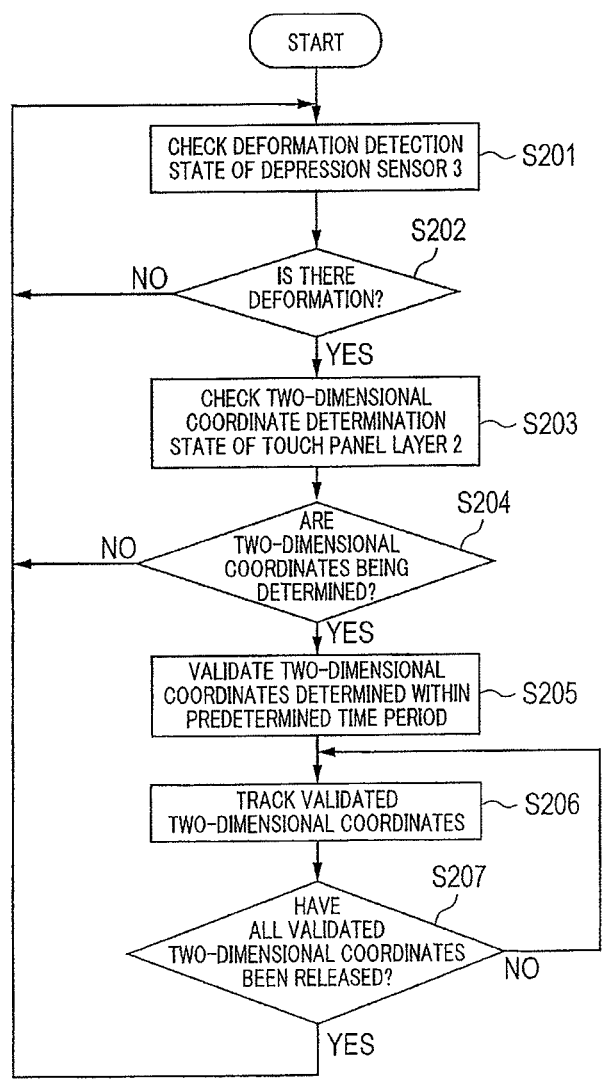
FIG. 8 is a flowchart showing an example of coordinate determination processing of the electronic device according to Embodiment 2.

Further, while in electronic device 1 according to Embodiment 1, a program for causing electronic device 1 to execute operation shown in the flowcharts of FIG. 7 and/or FIG. 8 is stored in, for example, a ROM (not shown) of control section 6, this program may be stored in components other than electronic device 1. For example, the program may be stored in, for example, a storage medium such as a magnetic disk, an optical disc, a magneto-optical disk, a flash memory, or a server on a network such as the Internet.

Further, while it is assumed that electronic device 1 according to Embodiment 1 is applied to mobile terminals such as a smartphone and a tablet, apparatuses to which electronic device 1 can be applied are not limited to the mobile terminals. Electronic device 1 can also be applied to, for example, home appliances (such as a microwave oven and a refrigerator), a car navigation system, an HEMS (Home Energy Management System), a BEMS (Building Energy Management System), and the like.

Further, while in electronic device 1 according to Embodiment 1, as shown in FIG. 5, touch panel layer 2, depression sensor 3 and display section 4 are arranged in this order under glass 11, the arrangement is not limited to this arrangement. Examples of the arrangement other than arrangement example 1 shown in FIG. 5 will be respectively described below with reference to the accompanying drawings.

Figure 9:
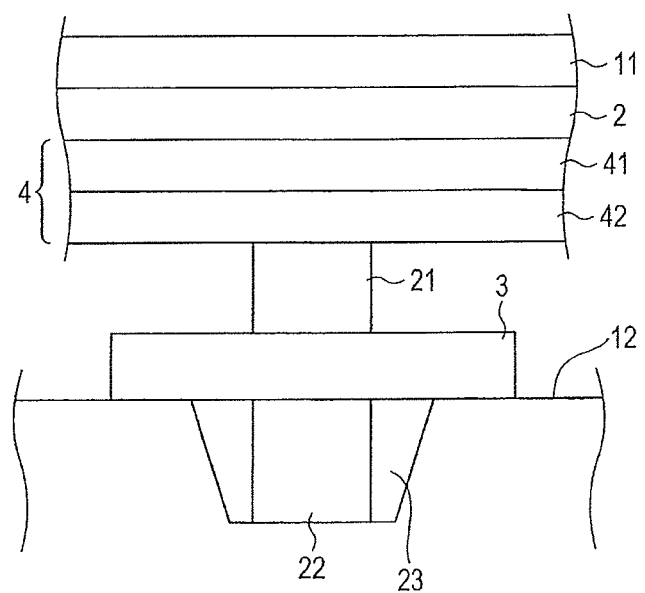
FIG. 9 shows arrangement example 2 of the glass, the touch panel layer, the depression sensor and the display section in the electronic device according to Embodiment 1.

FIG. 9 is a sectional side view of electronic device 1 in arrangement example 2. As shown in FIG. 9, under glass 11, touch panel layer 2, display section 4 (LCD 41 and backlight 42), plunger 21, depression sensor 3 and elastic member 22 are arranged in this order.

In FIG. 9, plunger 21 is disposed between backlight 42 and depression sensor 3. One end of plunger 21 is in contact with a face of backlight 42, while the other end of plunger 21 is fixed to a face of depression sensor 3. Recessed portion 23 is formed at frame portion 12 (example of one portion of housing 10) of housing 10. Elastic member 22 is vertically disposed at recessed portion 23 with one end of elastic member 22 being fixed to a bottom face of recessed portion 23 and the other end being fixed to one face of depression sensor 3 (back side of the face on which plunger 21 is fixed). Further, both ends of depression sensor 3 are fixed at frame portion 12.

In the configuration of FIG. 9, when pressure is applied to glass 11 by contact of a finger (bare hand or hand in a glove) of the user, plunger 21 presses down depression sensor 3 downward (in a direction of recessed portion 23). At this time, elastic member 22 shrinks so as to absorb the pressure on depression sensor 3. When the finger of the user move away from glass 11 and the pressure on glass 11 disappears, elastic member 22 stretches to return to the original length. Accordingly, depression sensor 3 is pushed upward (in a direction of backlight 42).

An example of a position where depression sensor 3 shown in FIG. 9 is disposed in electronic device 1 is shown in FIG. 10A to FIG. 10C. FIG. 10A, FIG. 10B and FIG. 10C each show a state where depression sensor 3 is disposed in the front face of housing 10 of electronic device 1. It should be noted that while depression sensor 3 shown in FIG. 10A to FIG. 10C has a rectangular shape, depression sensor 3 shown in FIG. 10A to FIG. 10C is considerably smaller in area than depression sensor 3 shown in FIG. 3, FIG. 4A and FIG. 4B.

FIG. 10A shows an example where depression sensor 3 is disposed in the center of housing 10. In FIG. 10A, depression sensor 3 is disposed so that a long side of depression sensor 3 is parallel to a short side of housing 10. FIG. 10B shows an example where depression sensor 3 is arranged in the center of housing 10. In FIG. 10B, depression sensor 3 is disposed so that a long side of depression sensor 3 is parallel to a long side of housing 10. FIG. 10C shows an example where two depression sensors 3 are respectively arranged near the short sides of housing 10. In FIG. 10C, each of two depression sensors 3 is disposed so that a long side of depression sensor 3 is parallel to a short side of housing 10.

Among three examples shown in FIG. 10A to FIG. 10C, the placement of depression sensor 3 shown in FIG. 10A can detect most deformation and can be realized at low cost. It should be noted that the positions where depression sensor 3 is disposed and the number of depression sensors 3 are not limited to the examples shown in FIG. 10A to FIG. 10C. For example, it is also possible to arrange four depression sensors 3 so as to be placed along all the four sides of housing 10, respectively.

Figure 11:
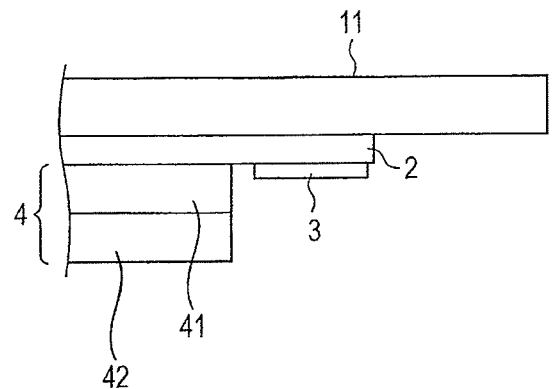
FIG. 11 shows arrangement example 3 of the glass, the touch panel layer, the depression sensor and the display section in the electronic device according to Embodiment 1.

FIG. 11 is a sectional side view of electronic device 1 in arrangement example 3. As shown in FIG. 11, touch panel layer 2 is disposed at a lower face side of glass 11, and depression sensor 3 is disposed at a periphery portion of a lower face side of touch panel layer 2. Further, at a position at the lower face side of touch panel layer 2 and away from depression sensor 3, LCD 41 and backlight 42 are arranged as display section 4. LCD 41 is disposed so as to face touch panel layer 2.

Figure 12:
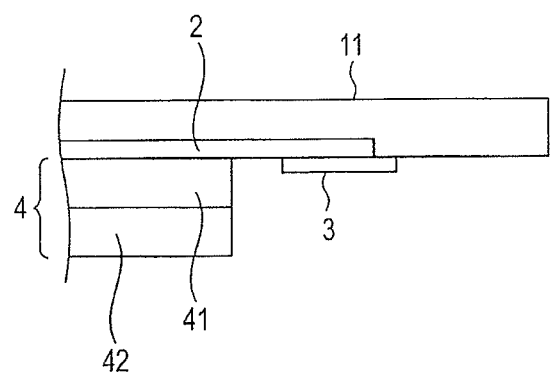
FIG. 12 shows arrangement example 4 of the glass, the touch panel layer, the depression sensor and the display section in the electronic device according to Embodiment 1.

FIG. 12 is a sectional side view of electronic device 1 in arrangement example 4. As shown in FIG. 12, touch panel layer 2 is disposed so as to fit into the lower face side of glass 11. That is, glass 11 and touch panel layer 2 are integrated. Depression sensor 3 is disposed over glass 11 and touch panel layer 2 at a lower face side of glass 11 and touch panel layer 2. Display section 4 is disposed in a similar manner to arrangement example 3 shown in FIG. 11.

Figure 13:
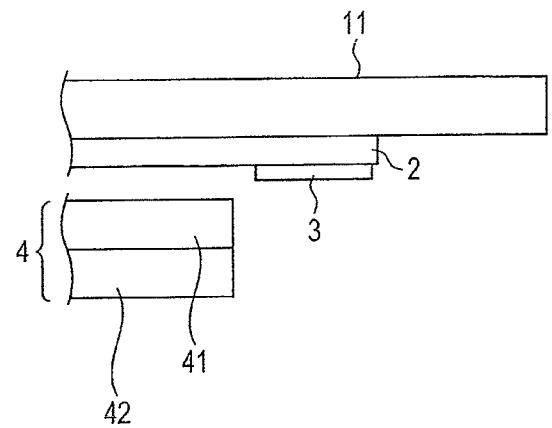
FIG. 13 shows arrangement example 5 of the glass, the touch panel layer, the depression sensor and the display section in the electronic device according to Embodiment 1.

FIG. 13 is a sectional side view of electronic device 1 in arrangement example 5. Arrangement example 5 shown in FIG. 13 is basically the same as arrangement example 3 shown in FIG. 11. A difference is that in arrangement example 5, touch panel layer 2 is disposed at a predetermined distance from LCD 41 of display section 4.

Figure 14:
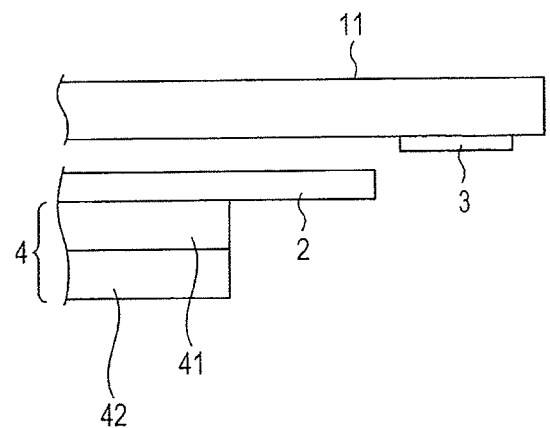
FIG. 14 shows arrangement example 6 of the glass, the touch panel layer, the depression sensor and the display section in the electronic device according to Embodiment 1.

FIG. 14 is a sectional side view of electronic device 1 in arrangement example 6. As shown in FIG. 14, depression sensor 3 is arranged at a periphery portion of the lower face side of glass 11. Touch panel layer 2 is disposed under glass 11 at a predetermined distance from glass 11. Display section 4 is arranged in a similar manner to arrangement example 3 shown in FIG. 11.

In the case of arrangement example 5 shown in FIG. 13 and arrangement example 6 shown in FIG. 14, it is possible to separate display section 4 from glass 11 (for example, by 5 mm to 15 mm). These arrangements are advantageous, for example, to avoid contact of display section 4 with an irregularity or the like of glass 11 when glass 11 has a slight irregularity or a slight curvature and display section 4 is hard. Alternatively, it is also possible to dispose display section 4 inside a side face (for example, a door) of a refrigerator and dispose glass 11 having slight curvature at a position of the side face corresponding to display section 4. Alternatively, it is also possible to dispose display section 4 having a large screen (for example, 50 inches) inside a show window and use a glass of the show window (glass belonging to the building) as glass 11.

Figure 15:
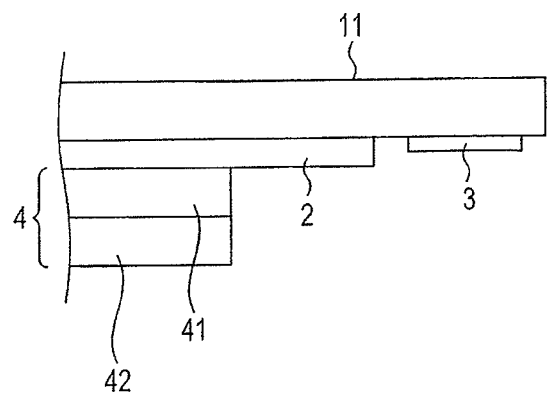
FIG. 15 shows arrangement example 7 of the glass, the touch panel layer, the depression sensor and the display section in the electronic device according to Embodiment 1.

FIG. 15 is a sectional side view of electronic device 1 in arrangement example 7. Arrangement example 7 shown in FIG. 15 is basically the same as arrangement example 6 shown in FIG. 14. A difference is that in arrangement example 7, touch panel layer 2 and glass 11 are arranged without a predetermined distance being provided therebetween.

Figure 16:
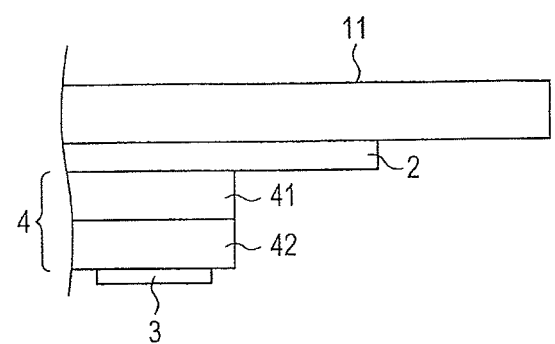
FIG. 16 shows arrangement example 8 of the glass, the touch panel layer, the depression sensor and the display section in the electronic device according to Embodiment 1.

FIG. 16 is a sectional side view of electronic device 1 in arrangement example 8. Arrangement example 8 shown in FIG. 16 is basically the same as arrangement example 3 shown in FIG. 11. A difference is that in arrangement example 8, depression sensor 3 is disposed at a lower face side of backlight 42 instead of being disposed at the lower face side of touch panel layer 2. It should be noted that depression sensor 3 may be arranged at an upper face side of either LCD 41 or backlight 42, at a side face side of either LCD 41 or backlight 42 or inside of either LCD 41 or backlight 42.

Figure 17:
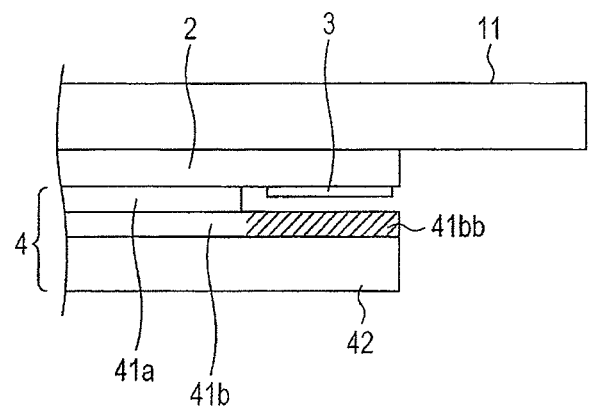
FIG. 17 shows arrangement example 9 of the glass, the touch panel layer, the depression sensor and the display section in the electronic device according to Embodiment 1.

FIG. 17 is a sectional side view of electronic device 1 in arrangement example 9. As shown in FIG. 17, display section 4 includes at least sheet-like transparent member 41a and transparent member 41b disposed while being overlapped with transparent member 41a, and liquid crystals are held between transparent member 41a and transparent member 41b.

Further, as shown in FIG. 17, transparent member 41a is disposed at the lower face side of touch panel layer 2, and transparent member 41b is disposed at a lower face side of transparent member 41a. Further, part of transparent member 41b, which is end portion 41bb of display section 4, protrudes outward from transparent member 41a. Depression sensor 3 is arranged at a portion corresponding to protruding end portion 41*bb* of transparent member 41*b* at the lower face side of touch panel layer 2.

According to this arrangement example 9, because depression sensor 3 is disposed at the portion corresponding to protruding end portion 41*bb* of transparent member 41*b*, it is not necessary to prepare new space for arranging depression sensor 3, and allows efficient use of the space in electronic device 1.

Figure 18:
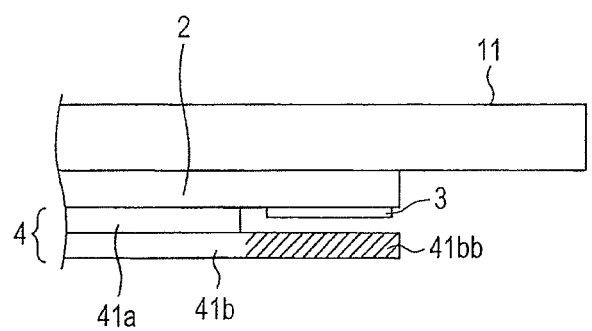
FIG. 18 shows arrangement example 10 of the glass, the touch panel layer, the depression sensor and the display section in the electronic device according to Embodiment 1.

FIG. 18 is a sectional side view of electronic device 1 in arrangement example 10. Arrangement example 10 shown in FIG. 18 is basically the same as arrangement example 9 shown in FIG. 17. A difference is that in arrangement example 10, backlight 42 is not provided. Accordingly, in this arrangement example 10, display section 4 has a configuration which can display images without the need of a backlight (for example, organic EL (electroluminescence)).

In this arrangement example 10, because depression sensor 3 is disposed at the portion corresponding to protruding end portion 41*bb* of transparent member 41*b* as with the above arrangement example 9, it is not necessary to prepare new space for disposing depression sensor 3, and it is possible to efficiently utilize space inside electronic device 1.

Further, the electronic device 1 and the like according to Embodiment 1 can also be regarded as follows.

(1-1)

An electronic device includes: a housing; a display section that is disposed inside the housing and that displays predetermined information; an electrostatic-capacitance touch panel section that allows visible light corresponding to display contents of the display section to pass through the electrostatic-capacitance touch panel section; a transparent member that protects the touch panel section and that allows the visible light corresponding to the display contents of the display section to pass through the transparent member; and a depression detecting section that detects deformation of the transparent member, in which the touch panel section is configured to detect a pair of two-dimensional coordinates indicated by an indicator having predetermined conductivity and located away from the touch panel section at a predetermined distance, in which when the touch panel section detects a plurality of pairs of two-dimensional coordinates and when the depression detecting section detects a predetermined amount of deformation: at least one pair of two-dimensional coordinates detected during a predetermined time period towards past based on a time point when the deformation is detected is validated; and a pair of two-dimensional coordinates detected before the predetermined time period based on the time point when the deformation is detected is not validated.

According to this configuration, in a state where a conductive material such as a water droplet still adheres to a touch panel, an immediate (last) pair of two-dimensional coordinates detected when operation is performed not only with a bare hand but also with a hand in a glove and depression is detected is validated, and a pair of two-dimensional coordinates therebefore is not validated. Consequently, it is possible to more reliably execute operation not only with a bare hand but also with a hand in a glove which is highly likely to be immediately before depression and further prevent erroneous detection of adherence of a water droplet as operation which is highly likely to be therebefore.

(1-2)

In the electronic device described in (1-1), the validation of the pair of two-dimensional coordinates is maintained until an indicator which indicates the validated pair of two-dimensional coordinates moves away from the touch panel section at a predetermined distance.

According to this configuration, the validation is maintained while a distance between the indicator detected by the touch panel section and the touch panel section is shorter than the predetermined distance based on this distance. That is, when this distance becomes longer than the predetermined distance, the validation is stopped. Consequently, it is possible to stop validation irrespectively of an output of the depression detecting section.

When an operator performs press and hold operation by an indicator (e.g. finger) or performs flick operation, depression on the touch panel section gradually becomes weak upon the end of these operations. Therefore, it is difficult to determine the end of these operations from an output of the depression detecting section from which a moderate change in depression is hardly detected. However, it is possible to stop validation irrespectively of an output of the depression detecting section as described above, and consequently, adequately determine the end of these operations.

(1-3)

In the electronic device described in (1-1) or (1-2), the validation of the two-dimensional coordinates is maintained until indicators which indicate the validated two-dimensional coordinates move away from the touch panel section at a predetermined distance, and a pair of two-dimensional coordinates determined after the validation is not validated.

According to this configuration, when validation is maintained in a state where a conductive material such as a water droplet still adheres to a touch panel, a pair of two-dimensional coordinates determined after the validation is not validated. Consequently, it is possible to prevent erroneous detection of adherence of a water droplet as operation after the validation.

(1-4)

In the electronic device described in any one of (1-1) to (1-3), when a vertical distance between the indicator and the touch panel section is equal to or less than a predetermined value, the pair of two-dimensional coordinates indicated by the indicator is determined.

(1-5)

In the electronic device described in (1-4), the predetermined value is a value larger than zero.

(1-6)

In the electronic device described in (1-4), the predetermined value is zero.

(1-7)

In the electronic device described in any one of (1-1) to (1-6), the depression detecting section is disposed between the transparent member and the touch panel section and allows visible light corresponding to display contents of the display section to pass through the depression detecting section.

(1-8)

In the electronic device described in any one of (1-1) to (1-6), the depression detecting section is disposed between the display section and part of the housing.

(1-9)

In the electronic device described in any one of (1-1) to (1-6), the transparent member and the touch panel section are integrated into one piece.

(1-10)

In the electronic device described in any one of (1-1) to (1-6), at least part of the depression detecting section is disposed while being overlapped with the display section.

(1-11)

In the electronic device described in any one of (1-1) to (1-6), the depression detecting section and the touch panel section are integrated into one piece.

(1-12)

A coordinate detecting method to be used for an electronic device that includes: a housing; a display section that is disposed inside the housing and that displays predetermined information; an electrostatic-capacitance touch panel section that allows visible light corresponding to display contents of the display section to pass through the electrostatic-capacitance touch panel section; a transparent member that protects the touch panel section and that allows visible light corresponding to display contents of the display section to pass through the transparent member; and a depression detecting section that detects deformation of the transparent member, in which the touch panel section is configured to detect a pair of two-dimensional coordinates indicated by an indicator having predetermined conductivity and located away from the touch panel section at a predetermined distance, the method including: when the touch panel section detects a plurality of pairs of two-dimensional coordinates and when the depression detecting section detects a predetermined amount of deformation, validating at least one pair of two-dimensional coordinates detected during a predetermined time period towards past based on a time point when the deformation is detected; and not validating a pair of two-dimensional coordinates detected before the predetermined time period based on the time point when the deformation is detected.

According to this configuration, in a state where a conductive material such as a water droplet still adheres to a touch panel, an immediate (last) pairs of two-dimensional coordinates detected when operation is performed not only with a bare hand but also with a hand in a glove and depression is detected is validated, and a pair of two-dimensional coordinates therebefore is not validated. Consequently, it is possible to more reliably execute operation not only with a bare hand but also with a hand in a glove which is highly likely to be immediately before depression and further prevent erroneous detection of adherence of a water droplet as operation which is highly likely to be therebefore.

(Embodiment) 2

Electronic device 1 according to Embodiment 2 of the present invention is common to that of Embodiment 1 concerning FIGS. 1 to 5, FIGS. 9 to 18 and FIG. 21, so that the redundant description will be omitted, hereinafter.

FIG. 8 is a flowchart showing coordinate determination processing according to Embodiment 2, and the coordinate determination processing according to Embodiment 2 will be described using FIG. 8.

While processing for validating only one pair of two-dimensional coordinates has been described with Embodiment 1, processing for validating a plurality of pairs of two-dimensional coordinates in order to support operation by a plurality of indicators (for example, multi-touch) will be described with Embodiment 2. It should be noted that because steps S201 to S204 in FIG. 8 are the same as steps S101 to S104 in FIG. 7, the description of the steps will be omitted.

In step S205, control section 6 validates all the pairs of two-dimensional coordinates determined within a predetermined time period. Accordingly, the pairs of two-dimensional coordinates validated in this step are pairs of two-dimensional coordinates indicated by all the coordinate information received by control section 6 within the predetermined time period. The predetermined time period is a time period (for example, a few seconds) including a time point when deformation is detected last (a deformation signal is received). Examples of the predetermined time period include the following (1) to (3):

(1) a time period from a starting point which is before a time point when deformation is detected last (hereinafter, referred to as a "deformation detecting time point") until the deformation detecting time point;

(2) a time period from the deformation detecting time point until an end point which is after the deformation detecting time point; and (3) a time period including the deformation detecting time point from a starting point before the deformation detecting time point until an end point after the deformation detecting time point.

In step S206, control section 6 tracks all the validated pairs of two-dimensional coordinates.

In step S207, control section 6 determines whether or not release is detected for all the validated pairs of two-dimensional coordinates.

When control section 6 receives coordinate information of any of all the validated pairs of two-dimensional coordinates from touch panel layer 2, control section 6 determines that release is not detected (step S207: NO), and the process returns to step S206. Meanwhile, when control section 6 no longer receives the coordinate information of all the validated pairs of two-dimensional coordinates from touch panel layer 2, control section 6 determines that release is detected (step S207: YES), and the process returns to step S201.

That is, when control section 6 validates a plurality of pairs of two-dimensional coordinates, control section 6 maintains the validated states of the pairs of two-dimensional coordinates unless release of all the validated pairs of two-dimensional coordinates is detected even if each pair of the two-dimensional coordinates changes. Further, control section 6 does not validate any pair of two-dimensional coordinates indicated by the coordinate information newly received while the validation is maintained, regardless of detection results of deformation.

(Embodiment 3)

Electronic device 1 according to Embodiment 3 of the present invention is common to that of Embodiment 1 concerning FIGS. 1 to 5, FIGS. 9 to 18 and FIG. 21, and FIGS. 1 to 5, FIGS. 9 to 18 and FIG. 21 will not be described.

Figure 22:
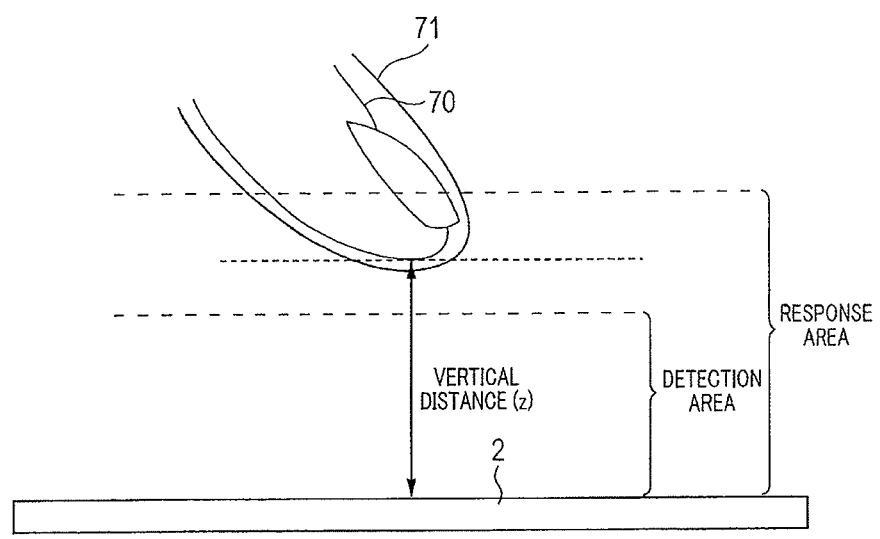
FIG. 22 shows a detection area and a response area in the electronic device according to Embodiment 3.

Touch panel layer 2 has a response area in which approach of a finger is detected when the finger approaches from far as shown in FIG. 22, and can detect a vertical distance inside the response area. A detection area in which whether or not there is the finger can be stably detected within a predetermined vertical distance (e.g. 5 mm) can be further provided.

In addition, it is possible to adequately determine a predetermined vertical distance corresponding to the detection area. By, for example, making a thickness of a material of a glove thicker (the predetermined vertical distance does not include 0 (zero)), the finger or the like in the globe can be detected, and a predetermined vertical distance may be 0 (zero) depending on cases.

Figure 25:
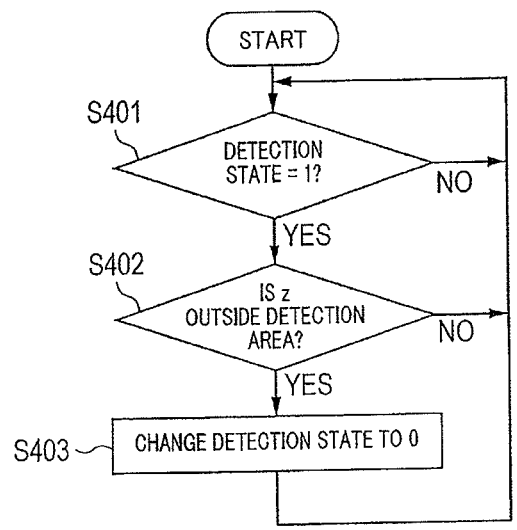
FIG. 25 is a flowchart showing a method of updating detection states in the coordinate detection state management table according to Embodiment 3.

Electronic device 1 according to Embodiment 3 adequately switches and executes single-point operation and multipoint operation by determining a pair of coordinates based on the flowchart showing coordinate determination processing in FIG. 25 while managing the coordinate detection state using a table which manages coordinate detection states shown in FIG. 23A or 23B. FIGS. 23A and 23B are described as "FIG. 23" below when not specified in particular.

In the table in FIG. 23, each row corresponds to one pair of coordinates of a management target. In columns of detection start times, absolute times when the finger enters a detection area for the first time are inputted.

A detection area will be described with reference to FIG. 22. Touch panel layer 2 has a response area which determines approach of a finger when the finger approaches from far, and can detect a vertical distance inside the response area. The detection area is an area within a predetermined vertical distance (e.g. 5 mm) in an area in which the vertical distance can be detected, and is an area in which whether or not there is a finger can be stably determined. In addition, although the detection area is provided inside the response area, the response area and the detection area may be an identical area.

In the table in FIG. 23, a row of a detection state indicates whether or not there is a finger in the detection area. "1" indicates that there is the finger and "0" indicates that there is not the finger. A column of xyz coordinates indicates xyz coordinates outputted from touch panel layer 2, and indicates xyz coordinates to follow xyz coordinates which start being detected at a detection start time in the same row even after start of detection and indicates xyz coordinates until the end of detection. A column of # indicates serial numbers of management target coordinates, and indicates 1 to 10. In addition, the table in FIG. 23 can be stored in storage section 5. Further, a z coordinate is a value based on an electrostatic-capacitance value of an indicator, and slightly changes based on an area of the indicator.

Figure 24:
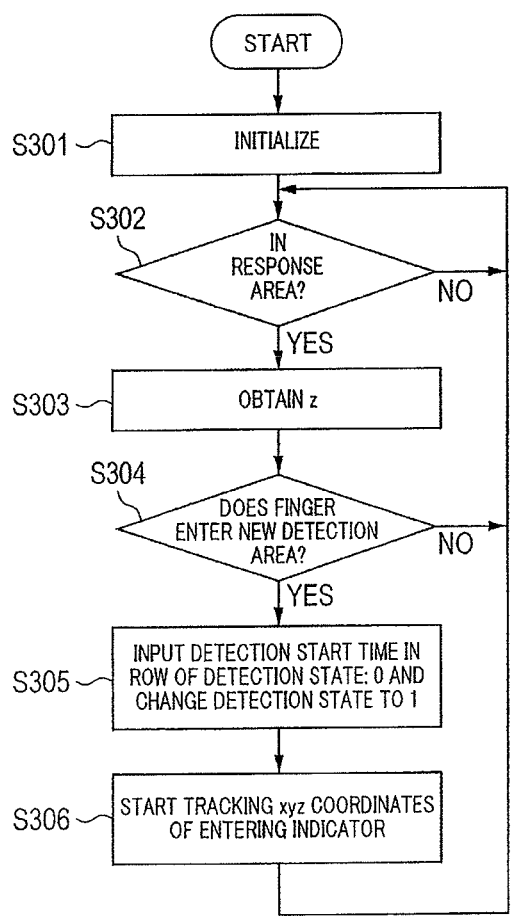
FIG. 24 is a flowchart showing a method of inputting detection start times and the like to the coordinate detection state management table according to Embodiment 3.

FIG. 24 is a flowchart showing a method of inputting a detection start time and the like in a coordinate detection state management table in FIG. 23. Control section 6 first initializes the coordinate detection state management table when starting detection (step S301). That is, control section 6 inputs 0 in detection start times, detection states and xyz coordinates in #1 to #10 of the coordinate detection state management table.

Next, control section 6 determines whether or not an indicator or the like (also including a water droplet or the like) enters the response area (step S302). When there is no indicator or the like in the response area (step S302: NO), control section 6 repeats step S302. When there is an indicator or the like in the response area (step S302: YES), control section 6 obtains a z coordinate through touch panel layer 2 (step S303). Control section 6 determines based on the obtained z coordinate whether or not the indicator or the like newly enters a detection area, for example, whether or not z newly becomes 5 mm or less (step S304). When the indicator or the like newly enters the detection area (step S304: YES), control section 6 inputs a time when detection starts, in the row of the detection state: 0 in the coordinate detection stage management table and changes the detection state of this row to 1 (step S305). Then, control section 6 starts detection while indicating the xyz coordinates corresponding to the indicator or the like having newly entered the detection area as the xyz coordinates of the row, and the xyz coordinates of this row change tracking the indicator or the like (step S306). Subsequently, control section 6 returns to step S302. Control section 6 has a clock (not shown) and can obtain the time when detection starts, by referring to this clock.

In step S304, when the indicator or the like does not enter the detection area or does not newly enter the detection area even if the indicator or the like is in the detection area (step S304: NO), control section 6 returns to step S302.

FIG. 25 is a flowchart indicating a method of updating detection states in the coordinate detection state management table in FIG. 23. This flowchart corresponds to one row of the coordinate detection state management table. Control section 6 determines whether or not the z coordinate is outside the detection area (e.g. whether or not the z coordinate is higher than 5 mm) based on the z coordinate of the xyz coordinates in the row (step S402) when the detection starts and the detection state in this row is 1 (step S401: YES). Control section 6 changes the detection state to 0 (step S403) when the z coordinate is outside the detection area (step S402: YES), and returns to step S401. Although there are ten rows in the coordinate detection state management table, the method of updating the detection states in FIG. 25 is executed with respect to each row.

By independently executing the method of inputting the detection start times and the like in FIG. 24 and the method of updating the detection states in FIG. 25, control section 6 can obtain xyz coordinates of a detection start time and a real time corresponding to the indicator or the like in a detection state in the coordinate detection state management table in FIG. 23.

Figure 26:
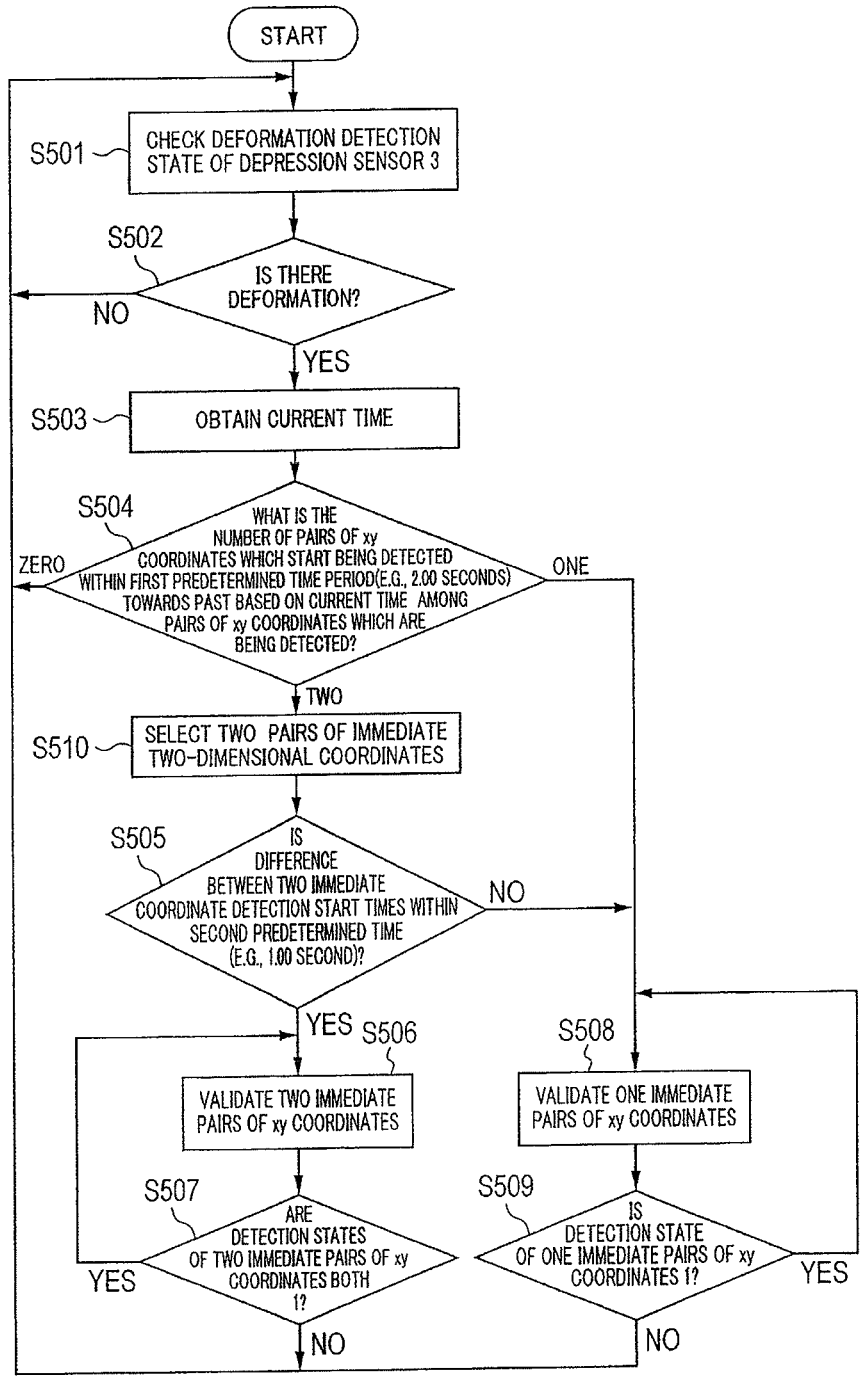
FIG. 26 is a flowchart showing an example of coordinate determination processing in the electronic device according to Embodiment 3.

FIG. 26 is a flowchart showing an example of coordinate determination processing of the electronic device according to Embodiment 3. When detection starts, control section 6 checks a deformation detection state of depression sensor 3 (i.e. whether depression sensor 3 detects that there is deformation of glass 11 or detects that there is no deformation of glass 11) based on a signal from depression sensor 3 in step S501.

In this regard, when receiving from depression sensor 3 a signal indicating that there is no deformation, control section 6 determines that there is no deformation of glass 11 (step S502: NO), and returns to step S501. Meanwhile, when receiving a signal from depression sensor 3 that there is deformation, control section 6 determines that there is deformation of glass 11 (step S502: YES), and the process proceeds to step S503.

Next, control section 6 obtains a current time by referring to a clock (which is provided inside control section 6 and is not shown) (step S503). In step S504, control section 6 determines the number of sets of xy coordinates which start being detected within a first predetermined time period (e.g. 2.00 seconds) towards the past based on the current time, among sets of xy coordinates which are being detected (detection state=1) by referring to the coordinate detection state management table in FIG. 23.

In addition, the first predetermined time period may include the current time or may not include the current time.

When the number of sets of xy coordinates which start being detected within the first predetermined time period is two or more in step S504, control section 6 selects two immediate sets of xy coordinates from among the sets of the xy coordinates which start being detected within the first predetermined time period (step S510).

Next, in step S505, control section 6 determines whether or not a difference between the detection start times of the two sets of immediate xy coordinates is within a second predetermined time period (e.g. 1.00 second). When the difference is within the second predetermined time period (step S505: YES), control section 6 validates the two sets of the immediate xy coordinates (step S506). When the detection states of the two sets of immediate xy coordinates are both 1 (step S507: YES), the process repeats step S506 and step S507: YES and control section 6 keeps the two immediate sets of xy coordinates validated.

In addition, the second predetermined time period is principally shorter than the first predetermined time period. Further, although control section 6 processes two immediate xy coordinates in step S510, step S505, step S506 and step S507, control section 6 may process three or more immediate sets of xy coordinates instead of two immediate sets of xy coordinates.

When at least one of the detection states of the two sets of immediate xy coordinates is 0 in step S507 (step S507: NO), control section 6 returns to step S501.

In step S505, when the difference between the detection start times of the two immediate sets of xy coordinates is not within the second predetermined time period (e.g. 1.00 second) (step S505: NO), control section 6 validates one immediate pair of xy coordinates (step S508). Control section 6 repeats step S508 and step S509: YES and keeps the one immediate pair of xy coordinates validated when the detection state of the one immediate pair of xy coordinates is 1 (step S509: YES).

Further, when the number of sets of xy coordinates which start being detected within the first predetermined time period is one in step S504, control section 6 validates a pair of xy coordinates corresponding to one pair of xy coordinates (i.e. one immediate pair of xy coordinates) (step S508). Control section 6 repeats step S508 and step S509: YES and keeps the one immediate pair of xy coordinates validated when the detection state of the one immediate pair of xy coordinates is 1 (step S509: YES).

In step S509, control section 6 returns to step S501 when the detection state of the one immediate pair of xy coordinates is 0 (step S509: NO).

Further, when the number of sets of xy coordinates which start being detected within the first predetermined time period is zero in step S504, control section 6 returns to step S501.

In addition, according to the coordinate determining method in FIG. 26, control section 6 does not principally validate a pair of xy coordinates except to validate a pair of xy coordinates in step S506 or step S508.

Control section 6 determines coordinates of an indicator or the like as a whole by executing the coordinate determining method in FIG. 26 in addition to the method of inputting the detection start times and the like in FIG. 24 and the method of updating the detection states in FIG. 25.

Figure 27A:
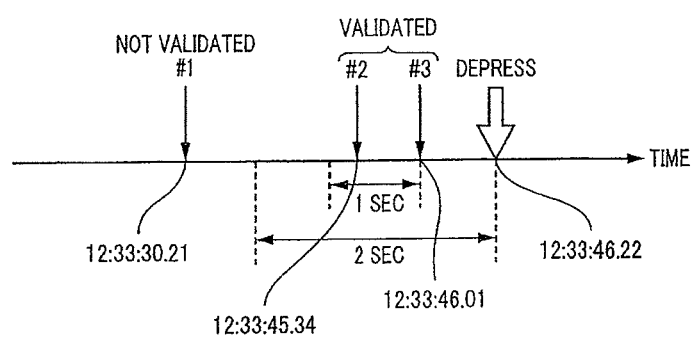
FIGS. 27A to 27D are each a schematic view showing an example of coordinate determination in the electronic device according to Embodiment 3.
Figure 27B:
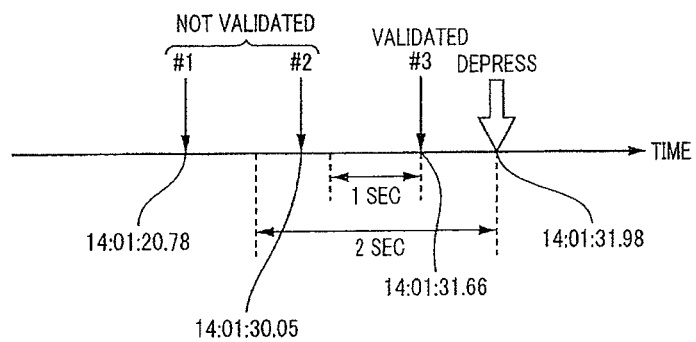
Figure 27C:
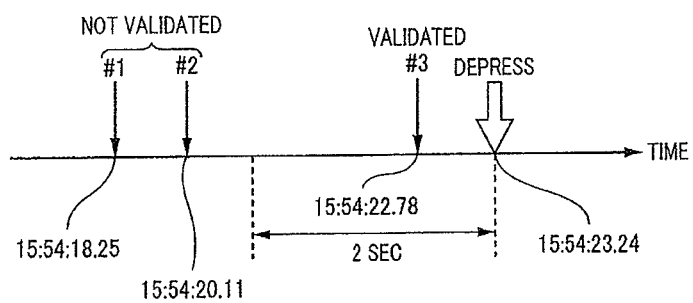
Figure 27D:
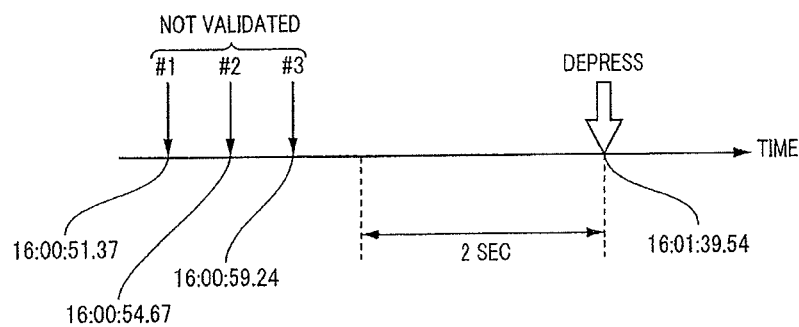

FIGS. 27A, 27B, 27C and 27D are schematic views each showing an example of coordinate determination. FIG. 27A corresponds to FIG. 23A, and shows an example in which coordinates of an indicator or the like in #2 and #3 are validated. FIG. 27B corresponds to FIG. 23B, and shows another example in which coordinates of an indicator or the like only in #3 are validated. FIG. 27C corresponds to FIG. 23C, and shows still another example in which coordinates of an indicator or the like only in #3 are validated. FIG. 27D corresponds to FIG. 23D, and shows yet another example in which coordinates of an indicator or the like in #1, #2 and #3 are not validated. These four examples will be described with reference to FIGS. 23A, 23B, 23C, 23D, 27A, 27B, 27C and 27D. Meanwhile, the first predetermined time period is 2.00 seconds, and the second predetermined time period is 1.00 second.

When, for example, depression sensor 3 detects depression at 12 o'clock 33 minutes 46.22 seconds in a state of the coordinate detection state management table shown in FIG. 23A, a detection start time of the indicator or the like in #1 is before the first predetermined time period (2.00 seconds) based on the depression time as shown in FIG. 27A, and a difference between the detection start times of the indicator or the like in #2 and #3 is within the first predetermined time period.

Further, the detection start time of the indicator or the like in #3 is immediate with respect to the depression time (the detection start time in #3 is closer to the depression time than the detection start time in #2). The detection start time in #2 is within the second predetermined time period (1.00 second) compared to the detection start time in #3.

When these examples are appropriated to the coordinate determining method in FIG. 26 and depression sensor 3 detects depression (step S501 and step S502: YES), control section 6 obtains the current time upon depression (12 o'clock 33 minutes 46.22 seconds) (step S503). The number of sets of xy coordinates within the first predetermined time period (2.00 seconds) from the current time (12 o'clock 33 minutes 46.22 seconds) is two in #2 and #3 among the coordinates in #1, #2 and #3 which are being detected (step S504: two or more). Control section 6 selects the coordinates in #2 and #3 within the first predetermined time period (2.00 seconds) from the current time (12 o'clock 33 minutes 46.22 seconds) (step S510).

Next, the difference between the coordinate detection start times in #2 and #3 is within the second predetermined time period (1.00 second) (step S505: YES), and control section 6 validates the coordinates in #2 and #3 (step S506). In addition, control section 6 does not validate the coordinates in #1.

While the indicator or the like both in #2 and #3 is in the detection state (detection state=1) (repetition of step S507: YES and step S506), control section 6 continues validating the xy coordinates in #2 and #3. When the indicator in one of #2 and #3 is not in the detection state (detection state=0) (step S507: NO), control section 6 returns to the first step (step S501).

In addition, in FIGS. 27A, 27B, 27C and 27D, the horizontal axis indicates time, and time progresses rightward. On this horizontal axis, an outlined bold arrow indicates a time point when depression sensor 3 detects depression, and thin arrows corresponding to #1, #2 and #3 indicate detection start times of the indicator or the like corresponding to #1, #2 and #3.

When, for example, depression sensor 3 detects depression at 14 o'clock 01 minute 31.98 seconds in a state of the coordinate detection state management table shown in FIG. 23B, a detection start time of the indicator or the like in #1 is before the first predetermined time period (2.00 seconds) based on the depression time as shown in FIG. 27B, and a difference between the detection start times of the indicator or the like in #2 and #3 is longer than the first predetermined time period.

When these examples are applied to the coordinate determining method in FIG. 26 and depression sensor 3 detects depression (step S501 and step S502: YES), control section 6 obtains the current time upon depression (14 o'clock 01 minute 31.98 seconds) (step S503). The number of sets of xy coordinates within the first predetermined time period (2.00 seconds) from the current time (14 o'clock 01 minute 31.98 seconds) is two in #2 and #3 among the coordinates in #1, #2 and #3 which are being detected (step S504: two or more). Control section 6 selects the coordinates in #2 and #3 within the first predetermined time period (2.00 seconds) from the current time (14 o'clock 01 minute 31.98 seconds) (step S510).

Next, the difference between the coordinate detection start times in #2 and #3 is larger than the second predetermined time period (1.00 second) (step S505: NO), and control section 6 validates the coordinates in #3 (step S508). In addition, control section 6 does not validate the coordinates in #1 and #2.

While the indicator or the like in #3 is in the detection state (detection state=1) (repetition of step S509: YES and step S508), control section 6 continues validating the pair of xy coordinates in #3. When the indicator in #3 is not in the detection state (detection state=0) (step S509: NO), control section 6 returns to the first step (step S501).

When, for example, depression sensor 3 detects depression at 15 o'clock 54 minutes 23.24 seconds in a state of the coordinate detection state management table shown in FIG. 23C, a detection start time of the indicator or the like in #1 and #2 is before the first predetermined time period (2.00 seconds) based on the depression time as shown in FIG. 27C, and the detection start time of the indicator or the like in #3 is within the first predetermined time period based on the depression time.

When these examples are applied to the coordinate determining method in FIG. 26 and depression sensor 3 detects depression (step S501 and step S502: YES), control section 6 obtains the current time upon depression (15 o'clock 54 minutes 23.24 seconds) (step S503). The number of sets of xy coordinates within the first predetermined time period (2.00 seconds) from the current time (15 o'clock 54 minutes 23.24 seconds) is one in #3 among the coordinates in #1, #2 and #3 which are being detected (step S504: one). Control section 6 validates the coordinates in #3 (step S508). In addition, control section 6 does not validate the coordinates in #1 and #2.

While the indicator or the like in #3 is in the detection state (detection state=1) (repetition of step S509: YES and step S508), control section 6 continues validating the pair of xy coordinates in #3. When the indicator in #3 is not in the detection state (detection state=0) (step S509: NO), control section 6 returns to the first step (step S501).

When, for example, depression sensor 3 detects depression at 16 o'clock 01 minute 39.54 seconds in a state of the coordinate detection state management table shown in FIG. 23D, detection start times of the indicator or the like in #1, #2 and #3 are before the first predetermined time period (2.00 seconds) based on the depression time as shown in FIG. 27D.

When these examples are applied to the coordinate determining method in FIG. 26 and depression sensor 3 detects depression (step S501 and step S502: YES), control section 6 obtains the current time upon depression (16 o'clock 01 minutes 39.54 seconds) (step S503). The number of sets of xy coordinates within the first predetermined time period (2.00 seconds) from the current time (16 o'clock 01 minute 39.54 seconds) is zero among the sets of coordinates in #1, #2 and #3 which are being detected (step S504: zero). Control section 6 returns to the first step (step S501). In this example, control section 6 does not validate the sets of coordinates in #1, #2 and #3.

In addition, values of xyz coordinates in FIG. 23 are values indicating a difference from the origin using a predetermined point as the origin of xy. For example, the values are in units of mm. Here, "z" is a value indicating a distance from an upper surface of glass 11 along a direction from the touch panel layer to glass 11 when the upper surface of glass 11 is 0. The values are in units of mm, for example. However, a z coordinate takes a value based on an electrostatic-capacitance value of an indicator, and slightly changes depending on the area of the indicator.

Further, two immediate sets of xy coordinates validated in step S506 can be utilized for pinching operation, and one immediate pair of xy coordinates validated in step S508 can be utilized for a pointer coordinate.

According to the coordinate determining method in FIG. 26 described above, part of the coordinate determining method may be extracted and performed. For example, step S501, step S502, step S503, step S504, step S506 or step S508 may be extracted and performed. In this case, when a plurality of sets of two-dimensional coordinates are detected by the touch panel section and when a predetermined amount of deformation is detected by the depression detecting section, at least one pair of two-dimensional coordinates detected during the first predetermined time period towards the past based on a time point when deformation is detected is validated, and pairs of two-dimensional coordinates detected before the predetermined time period based on the time point when the deformation is detected are not validated. In a state where a conductive material such as a water droplet still adheres to a touch panel, pairs of two-dimensional coordinates detected during the predetermined time towards the past based on a time point when operation is performed not only with a bare hand but also with a hand in a glove and depression is detected are validated, and pairs of two-dimensional coordinates before the predetermined time period are not validated. Consequently, it is possible to more reliably execute operation not only with a bare hand but also with a hand in a glove which is highly likely to be within the predetermined time immediately before depression and further prevent erroneous detection of adherence of a water droplet as operation which is highly likely to be before the predetermined time period.

Further, for example, step S501, step S502, step S503, step S504 and step S508 may be extracted and performed. In this case, when a plurality of pairs of two-dimensional coordinates are detected by the touch panel section and when a predetermined amount of deformation is detected by the depression detecting section, at least one pair of two-dimensional coordinates detected is validated among pairs of two-dimensional coordinates detected during the first predetermined time period towards the past based on a time point when deformation is detected is validated, and pairs of two-dimensional coordinates detected before the first predetermined time period based on the time point when the deformation is detected are not validated. In a state where a conductive material such as a water droplet still adheres to a touch panel, when at least one pair of two-dimensional coordinates is validated, pairs of two-dimensional coordinates detected during the predetermined time towards the past based on a time point when operation is performed not only with a bare hand but also with a hand in a glove and depression is detected are validated, and pairs of two-dimensional coordinates before the predetermined time period are not validated. Consequently, it is possible to more reliably execute operation not only with a bare hand but also with a hand in a glove which are highly likely to be within the predetermined time immediately before depression and further prevent erroneous detection of adherence of a water droplet as operation which is highly likely to be before the predetermined time period. In addition, an immediate pair of coordinates is validated within the predetermined period, so that it is possible to further prevent erroneous detection of adherence of a water droplet as operation.

Further, for example, step S501, step S502, step S503, step S504, step S508 and step S509 may be extracted and performed. In this case, after an immediate pair of two-dimensional coordinates based on the time point when the deformation is detected is validated among pairs of two-dimensional coordinates detected during the first predetermined time period towards past based on the time point when the deformation is detected, and while the indicator which indicates the validated pairs of two-dimensional coordinates moves away from the touch panel section at the predetermined distance, a change in the validated pairs of two-dimensional coordinates can be followed and a pair of two-dimensional coordinates newly detected after the validation and indicated by the indicator is not validated. Consequently, it is possible to further prevent erroneous detection of adherence of a water droplet as operation after the immediate pair of two-dimensional coordinates is validated.

Further, for example, step S501, step S502, step S503, step S504, step S510, step S505, step S506 and step S508 may be extracted and performed. In this case, when a plurality of pairs of two-dimensional coordinates are detected by the touch panel section and when a predetermined amount of deformation is detected by the depression detecting section, two immediate pairs of two-dimensional coordinates based on the time point when the deformation is detected are selected from pairs of two-dimensional coordinates detected during the first predetermined time period towards the past based on the time point when the deformation is detected, when a difference between detection start times of the indicator which indicates the two selected pairs of two-dimensional coordinates is smaller than a second predetermined time period, the two selected pairs of two-dimensional coordinates are validated, and when the difference between detection start times of the indicators which indicate the two selected pairs of two-dimensional coordinates is larger than the second predetermined time period, one immediate pair of two-dimensional coordinates based on the time point when the deformation is detected is validated. In a state where a conductive material such as a water droplet still adheres to a touch panel, two immediate pairs of two-dimensional coordinates are selected from pairs of two-dimensional coordinates detected during the first predetermined time period towards the past based on the time point when operation is performed not only with a bare hand but also with a hand in a glove and depression is detected. Validating the two immediate pairs of two-dimensional coordinates based on the difference between the two immediate detection start times and validating one immediate pair of two-dimensional coordinates is switched so as not to validate a pair of two-dimensional coordinate before the validated pair of two-dimensional coordinates. Consequently, it is possible to more reliably execute operation not only with a bare hand but also with a hand in a glove which are highly likely to be within the first predetermined time immediately before depression and further prevent erroneous detection of adherence of a water droplet as operation which is highly likely to be before the first predetermined time period. Further, it is possible to support one-point touch and two-point touch.

Further, for example, step S501, step S502, step S503, step S504, step S510, step S505, step S506, step S507, step S508 and the like may be extracted and performed. In this regard, after the two selected pairs of two-dimensional coordinates are validated, while one of indicators which indicates the validated pairs of two-dimensional coordinate moves away from the touch panel section at the predetermined distance, a change in the validated pairs of two-dimensional coordinates can be followed and a pair of two-dimensional coordinates newly detected after the validation and indicated by the indicator is not validated. Consequently, it is possible to further prevent erroneous detection of adherence of a water droplet as operation after the two pairs of immediate two-dimensional coordinates is validated.

INDUSTRIAL APPLICABILITY

The present invention is useful for techniques (for example, apparatuses, systems, methods, programs, or the like) which use an electrostatic-capacitance touch panel.

REFERENCE SIGNS LIST

1 Electronic device
2 Touch panel layer
3 Depression sensor
4 Display section
5 Storage section
6 Control section
10 Housing
11 Glass
12 Frame portion
23 Recessed portion
30 Icon
41 LCD
42 Backlight
70 Finger
71 Glove
80, 81 Water droplet

What is claimed is:

1. An electronic device comprising:
a housing;
a display that is disposed inside the housing and that displays predetermined information;
an electrostatic-capacitance touch panel that allows visible light corresponding to display contents of the display to pass through the electrostatic-capacitance touch panel;
a transparent member that protects the touch panel and that allows the visible light corresponding to the display contents of the display to pass through the transparent member; and
a depression detector that detects deformation of the transparent member, wherein
the touch panel is configured to detect a pair of two-dimensional coordinates indicated by an indicator having predetermined conductivity, wherein
when the touch panel detects a plurality of pairs of two-dimensional coordinates and when the depression detector detects a predetermined amount of deformation; at least one pair of two-dimensional coordinates detected during a predetermined time period prior to a time when the deformation is detected is validated; and
a pair of two-dimensional coordinates detected before the predetermined time period prior to the time when the deformation is detected, is not validated,
wherein the predetermined time period does not include a deformation of an amount equal to or greater than the predetermined amount of deformation.

2. The electronic device according to claim 1, wherein the predetermined time period does not include the time when the deformation is detected.

3. The electronic device according to claim 1, wherein, when the touch panel detects a plurality of the pairs of two-dimensional coordinates and when the depression detector detects the predetermined amount of deformation: one immediate pair of two-dimensional coordinates, based on the time when the deformation is detected, is validated, among the pairs of two-dimensional coordinates detected during a predetermined time period prior to the time when the deformation is detected; and a pair of two-dimensional coordinates detected before the predetermined time period, based on the time when the deformation is detected, is not validated, and a pair of two-dimensional coordinates, other than the one immediate pair of two-dimensional coordinates, among the pairs of two-dimensional coordinates detected during the predetermined time period, is not validated.

4. The electronic device according to claim 3, wherein, after the immediate pair of two-dimensional coordinates, based on the time when the deformation is detected, is validated, among the pairs of two-dimensional coordinates detected during the predetermined time period prior to the time when the deformation is detected, while the indicator, that indicates the validated pair of two-dimensional coordinates, moves away from the touch panel at a predetermined distance, a change in the validated pair of two-dimensional coordinates is trackable, and a pair of two-dimensional coordinates, newly detected after the validation and indicated by the indicator, is not validated.

5. The electronic device according to claim 1, wherein the predetermined time period is a first predetermined time period, and when the touch panel detects a plurality of the pairs of two-dimensional coordinates and when the depression detector detects the predetermined amount of deformation; two immediate pairs of two-dimensional coordinates, based on the time when the deformation is detected, are selected from pairs of two-dimensional coordinates detected during the first predetermined time period prior to the time when the deformation is detected;

when a difference between detection start times of the indicator that indicates the two selected pairs of two-dimensional coordinates is smaller than a second predetermined time period, the two selected pairs of two-dimensional coordinates are validated; and when the difference between detection start times of the indicator that indicates the two selected pairs of two-dimensional coordinates is larger than the second predetermined time period, one immediate pair of two-dimensional coordinates, based on the time when the deformation is detected, is validated.

6. The electronic device according to claim 5, wherein the second predetermined time period is shorter than the first predetermined time period.

7. The electronic device according to claim 5, wherein, after the two selected pairs of two-dimensional coordinates are validated, while one of indicators that indicates the validated pair of two-dimensional coordinates moves away from the touch panel at the predetermined distance, a change in the validated pair of two-dimensional coordinates is trackable, and a pair of two-dimensional coordinates newly detected after the validation and indicated by the indicator is not validated.

8. A coordinate detecting method to be used for an electronic device that includes:

a housing;
a display that is disposed inside the housing and that displays predetermined information;
an electrostatic-capacitance touch panel that allows visible light corresponding to display contents of the display to pass through the electrostatic-capacitance touch panel;
a transparent member that protects the touch panel and that allows visible light corresponding to display contents of the display to pass through the transparent member; and
a depression detector that detects deformation of the transparent member, wherein
the touch panel is configured to detect a pair of two-dimensional coordinates indicated by an indicator having predetermined conductivity, the method comprising:

when the touch panel detects a plurality of pairs of two-dimensional coordinates and when the depression detector detects a predetermined amount of deformation after the pairs of two-dimensional coordinates are detected, validating at least one pair of two-dimensional coordinates detected during a predetermined time period prior to a time when the deformation is detected; and not validating a pair of two-dimensional coordinates detected before the predetermined time period prior to the time when the deformation is detected, wherein the predetermined time period does not include a deformation of an amount equal to or greater than the predetermined amount of deformation.

9. The electronic device according to claim 1, wherein the deformation detected by the depression detector does not provide an input independent of the inputs of the pair of two-dimensional coordinates.

10. The coordinate detecting method according to claim 8, wherein the predetermined time period does not include the time when the deformation is detected.

11. The coordinate detecting method according to claim 8, wherein, when the touch panel detects a plurality of the pairs of two-dimensional coordinates and when the depression detector detects the predetermined amount of deformation: one immediate pair of two-dimensional coordinates, based on the time when the deformation is detected, is validated, among the pairs of two-dimensional coordinates detected during a predetermined time period prior to the time when the deformation is detected; and a pair of two-dimensional coordinates detected before the predetermined time period, based on the time when the deformation is detected, is not validated, and a pair of two-dimensional coordinates, other than the one immediate pair of two-dimensional coordinates, among the pairs of two-dimensional coordinates detected during the predetermined time period, is not validated.

12. The coordinate detecting method according to claim 11, wherein, after the immediate pair of two-dimensional coordinates, based on the time when the deformation is detected, is validated, among the pairs of two-dimensional coordinates detected during the predetermined time period prior to the time when the deformation is detected, while the indicator, that indicates the validated pair of two-dimensional coordinates, moves away from the touch panel at a predetermined distance, a change in the validated pair of two-dimensional coordinates is trackable, and a pair of two-dimensional coordinates, newly detected after the validation and indicated by the indicator, is not validated.

13. The coordinate detecting method according to claim 8, wherein the predetermined time period is a first predetermined time period, and when the touch panel detects a plurality of the pairs of two-dimensional coordinates and when the depression detector detects the predetermined amount of deformation; two immediate pairs of two-dimensional coordinates, based on the time when the deformation is detected, are selected from pairs of two-dimensional coordinates detected during the first predetermined time period prior to the time when the deformation is detected;

when a difference between detection start times of the indicator that indicates the two selected pairs of two-dimensional coordinates is smaller than a second predetermined time period, the two selected pairs of two-dimensional coordinates are validated; and when the difference between detection start times of the indicator that indicates the two selected pairs of two-dimensional coordinates is larger than the second predetermined time period, one immediate pair of two-dimensional coordinates, based on the time when the deformation is detected, is validated.

14. The coordinate detecting method according to claim 13, wherein the second predetermined time period is shorter than the first predetermined time period.

15. The coordinate detecting method according to claim 13, wherein, after the two selected pairs of two-dimensional coordinates are validated, while one of indicators that indicates the validated pair of two-dimensional coordinates moves away from the touch panel at the predetermined distance, a change in the validated pair of two-dimensional coordinates is trackable, and a pair of two-dimensional coordinates newly detected after the validation and indicated by the indicator is not validated.

16. The coordinate detecting method according to claim 8, wherein the deformation detected by the depression detector does not provide an input independent of the inputs of the pair of two-dimensional coordinates.

\* \* \* \* \*